US012769642B2

(12) United States Patent
Krepps

(10) Patent No.: US 12,769,642 B2
(45) Date of Patent: Oct. 20, 2026

(54) SYSTEM AND METHOD FOR LATENCY LEVELING IN ELECTRONIC TEST ENVIRONMENTS

(71) Applicant: The Economist's Advocate, Inc., Milton, MA (US)

(72) Inventor: Matthew Krepps, Milton, MA (US)

(73) Assignee: The Economist's Advocate, Inc., Milton, MA (US)

( * ) Notice: Subject to any disclaimer, the term of this patent is extended or adjusted under 35 U.S.C. 154(b) by 0 days.

(21) Appl. No.: 19/440,509

(22) Filed: Jan. 5, 2026

(65) Prior Publication Data

US 2026/0127102 A1 May 7, 2026

Related U.S. Application Data

(63) Continuation of application No. 18/733,189, filed on Jun. 4, 2024.

(51) Int. Cl.
*G06Q 40/06* (2012.01)
*G06F 11/3668* (2025.01)

(52) U.S. Cl.
CPC ...... *G06F 11/3688* (2013.01); *G06F 11/3684* (2013.01)

(58) Field of Classification Search
CPC .. G06F 11/3688; G06F 11/3684; G06Q 40/06
See application file for complete search history.

(56) References Cited

U.S. PATENT DOCUMENTS

| | | | | |
|---|---|---|---|---|
| 5,406,279 | A | 4/1995 | Anderson et al. | |
| 5,572,206 | A | 11/1996 | Miller et al. | |
| 7,249,080 | B1 | 7/2007 | Hoffman et al. | |
| 7,461,026 | B2 * | 12/2008 | Schluetter | G06Q 40/00 726/13 |
| 10,650,450 | B2 * | 5/2020 | Aisen | H04L 43/0858 |
| 10,722,799 | B2 | 7/2020 | Thaler | |
| 12,282,955 | B2 * | 4/2025 | Merold | G06Q 40/04 |
| 12,586,130 | B1 * | 3/2026 | Montesano | G06Q 40/04 |
| 2008/0243676 | A1 * | 10/2008 | Smith | G06Q 40/04 705/37 |
| 2009/0193136 | A1 * | 7/2009 | Doty | G06F 9/544 709/231 |

(Continued)

FOREIGN PATENT DOCUMENTS

| | | | | |
|---|---|---|---|---|
| CN | 114692944 A * | 7/2022 | | G06N 3/044 |
| WO | WO 2020069748 A1 | 4/2020 | | |

*Primary Examiner* — Eyob Hagos
(74) *Attorney, Agent, or Firm* — Fish & Richardson P.C.

(57) ABSTRACT

Methods, systems, and apparatus, including computer programs encoded on a computer storage medium, for accessing, by a data processing system and from a hardware device, outbound latency data and inbound latency data defining an outbound latency and an inbound latency to control a transmission of electronic test orders from a plurality of test subject devices independent of the computational powers of multiple test subject devices. The outbound latency defined by the outbound latency data is restricted to execution of electronic test orders and transmission of an electronic test order is restricted to one or more times. An execution of electronic test orders is triggered by an electronic test environment.

20 Claims, 12 Drawing Sheets

(56) References Cited

U.S. PATENT DOCUMENTS

| | | | | |
|---|---|---|---|---|
| 2010/0070428 | A1 * | 3/2010 | Stamer | G06Q 40/06 705/36 R |
| 2010/0145873 | A1 * | 6/2010 | Bakaya | G06Q 40/00 705/37 |
| 2012/0166358 | A1 * | 6/2012 | Steinberg | G06Q 40/06 705/36 R |
| 2020/0043094 | A1 * | 2/2020 | Sallent | G06Q 40/04 |
| 2022/0261906 | A1 * | 8/2022 | Stevens | G06Q 40/04 |
| 2022/0358589 | A1 * | 11/2022 | Tooley | G06Q 40/04 |
| 2023/0196456 | A1 | 6/2023 | Krepps | |
| 2025/0370916 | A1 | 12/2025 | Krepps | |

* cited by examiner

SYSTEM AND METHOD FOR LATENCY LEVELING IN ELECTRONIC TEST ENVIRONMENTS

RELATED APPLICATION

This application claims priority to U.S. application Ser. No. 18/733,189, filed on Jun. 4, 2024, the entire contents of which are hereby incorporated by reference in its entirety.

TECHNICAL FIELD

The present disclosure relates to computer implemented methods and systems for providing inbound and outbound latency leveling in an electronic test environment.

BACKGROUND

The complexity of a network infrastructure utilizing multiple computing systems configured for high frequency queries and real time data processing has a direct effect on order execution latencies. Improvement in hardware performance of the computing systems has partly addressed the issues with low latency. Streamlining software algorithms and minimizing data processing delays can enhance system resilience to handle high frequency queries that can affect order execution latencies.

SUMMARY

Implementations of the present disclosure are directed to techniques and tools for providing inbound and outbound latency leveling in an electronic test environment. More particularly, implementations of the present disclosure are directed to eliminating order execution latencies and solving challenges associated with creating a testing platform that permits the introduction of realistic financial incentives, by leveling inbound information latencies to create a level playing field.

A computational system and graphical user interface for effectuating a controlled and secured test of portfolio construction ability, along with a feedback system enables test systems to determine respective asset management capabilities and to improve the respective capabilities.

Embodiments of the invention relate generally to testing a singular system's relative performance at investment portfolio construction and, in particular, to providing a realistic risk and reward simulation that tests the ability of a singular system to outperform other systems after correcting for inbound information latencies and outbound order execution latencies. A level regulated environment within a network including multiple computing systems with realistic incentives includes multiple latency control parameters.

For example, in a first aspect, a system facilitates test subjects to optimize in real-time their respective portfolio weighting choices across assets to solve the constrained optimization problem of maximizing expected portfolio variance subject to the boundary conditions associated with the delineation of a "Broad-Based Security Index" hereafter "BBSI". The optimization can be based on the percentage weighting of each security selected, sequentially for each of 9 or more securities, displaying information for the test subject regarding the maximum weighting that can be assigned to the test subject's preferred choice. The options presented can be customized based on the test subject's preference level (how many favorites are identified in a user input, which could be 1, 2, 3, or more). The displayed options can be adjusted according to permutations that facilitate portfolio variance within set limits.

In another aspect, a system eliminates inbound information latencies instantaneously (e.g., within miliseconds). For example, the system can present to the test subject instantaneously, based on each of the test subject's asset selection inputs, an array of all other assets within the selection universe ranked in descending order of trailing 6-month price correlation, the compilation of which requires calculating, sorting, and selectively displaying from a universe of 18,000,000 data fields. Based on the first asset chosen, and each asset sequentially after the first, display in real-time and ranked in descending order, the other 6000 assets and their 6-month trailing Pearson correlation coefficient with the chosen asset. This information must be immediately available no matter which of the universe of 6000 assets the test subject initially selects, so the precise 6000 cross-correlations must be selected immediately from the 18,000,000 cross-correlations in the stock selection universe, then ranked in descending order, and presented in real-time to the test subject. As another example, the system can present to the test subject instantaneously, based on the test subject's final asset selection inputs, a confirmation of whether the lowest weighted assets in the test subject's chosen portfolio have the minimum required dollar value of average daily trading volume for the prior 6-month period. Specifically, after the test subject has selected the final portfolio component security, the system must instantaneously calculate whether either the lowest weighted component securities comprising, in the aggregate, 25 percent of the weighting of the index product have an aggregate dollar value of average daily trading volume ("ADTV") of $50 million or more, or, in the case of an index product with 15 or more component securities, $30 million or more.

Particular embodiments of the subject matter described in this specification can be implemented to realize one or more of the following advantages. The techniques described in this specification provide, a controlled lock of portfolio rebalancing that neutralizes a potentially unfair advantage that can be gained by computing systems with top ranking computational power or speed, enabling a fair distribution of portfolios, independent of the computational power or speed of the computing systems participating in a portfolio rebalancing test. The fair distribution of portfolios is based on inbound and outbound latency leveling. Inbound (received) and outbound (transmitted) latency leveling includes a latency equalization or latency balancing, based on a computing technique that facilitates arrival and transmission of data packets originating from different computing system sources or network communication routes to experience substantially similar temporal delays. The latency leveling facilitates maintenance of quality and consistency of data transmission, which is especially important for applications that are sensitive to latency variations.

In another aspect, a system eliminates outbound order execution latencies using a set of control parameters. For example, the techniques described in this specification can eliminate outbound order execution latencies through the creation of a shadow exchange in which test subjects allocate a notional investment budget with Market on Open and Market on Close Orders, to be "executed" at published prices and tracked by the shadow exchange as if those assets had been bought or sold at the test subject-nominated times. Because the test subjects' orders are never sent to the actual exchanges, these orders do not affect published market prices and all test subjects receive the same price for each selected asset with no opportunity for high frequency traders to engage in latency arbitrage. As another example, the system can eliminate outbound order execution latencies by requiring test subjects to define concentrations ("I want 30% of my portfolio invested in Company X), not prices per share or number of shares. In order to eliminate latency arbitrage, a system is needed where each test subject receives the same price per unit for a given asset. The system can generate a request for each test subject to nominate their selections in advance, so selecting a price per share or a number of shares/units would not allow the system to run compliance checks against the weighting boundary conditions. As another example, the system can eliminate outbound order execution latencies by prohibiting the rebalancing of portfolios (e.g., by locking a set order and distribution of portfolios) once the portfolio is designated and the performance test has begun. The controlled lock of portfolio rebalancing can be a test of one's fundamental asset analysis capabilities. In an uncontrolled setting, test subjects can move in and out of positions in real time during the test to enable asymmetric inbound information latencies to gain an unfair advantage to the computing systems with superior computational power or system architecture speed advantages As another technical advantage, the techniques described in this specification provide protection of user data privacy and security. Adaptation of data encryption for transmission and storing can enable secure management of data records. The generation of additional electronic test orders that are candidates for selection that satisfy one or more boundary conditions of the electronic test environment can be faster than in conventional systems in which separate, different protocols are applied. The generation of controlled data distribution is based on specifying a maximum weighted value of another electronic test order based on the weighted value of the electronic test order, with the indication, for each additional electronic test order, specifying a maximum weighted value assignable to that additional electronic test order based on the weighted value of the electronic test order and further specifying a cross correlation metric for that additional electronic test order. The described implementations facilitate imposing outbound and inbound latencies, receiving, from each test subject device, multiple electronic test orders satisfying the one or more boundary conditions. The techniques described in this specification advantageously leverage secure and efficient execution of the electronic test orders by the electronic test environment. The parsing and simulation of data can be supported and optimized using machine learning models built to optimize latency control according to applied boundary conditions and optimized conflict resolutions. The optimization of conflict resolutions can include model training. The trained information can be used to predict optimized conflict resolutions based on patterns of historical data.

According to an aspect, a computer implemented method for generating a maximally concentrated broad-based security index, the method comprising: receiving, through a graphical user interface, selection data specifying selection of a visual representation of a security and further specifying a concentration of the security, with the selection data being associated with a key that uniquely identifies a test subject associated with the selection data; accessing, from a hardware storage device, one or more data records that are encrypted, for generating secured data records (e.g., secured to prevent malicious tampering), using the key, with the one or more data records structured to specify one or more previously selected securities and one or more respective concentrations of the one or more previously selected securities; accessing, from the hardware storage device, one or more data structures specifying a plurality of constraints for constructing a broad-based security index (index or "BBSI"); parsing, by a parser of the data processing system, the one or more data records to identify, based on the structure, data specifying the one or more previously selected securities and data specifying the one or more respective concentrations; based on the parsed data, determining, by the data processing system, whether a conflict exists among the concentration of the security with respective concentrations of the previously selected securities and the BBSI constraints; when a conflict exists, prompting, through the graphical user interface, a test subject for input to resolve the conflict; when there is no determined conflict, determining whether the concentration of the security or at least one of the one or more concentrations of the previously selected securities can be increased, relative to an original concentration of the security, without violating the BBSI constraints; storing, in the hardware storage device, the one or more keyed data records structured with data specifying a concentration of the security; when at least one of the one or more concentrations of the security and the one or more previously selected securities can be increased without violating the BBSI constraints, prompting, through the graphical user interface, the test subject to increase the at least one of the one or more concentrations of the security and the one or more previously selected securities; and when the test subject selects to increase the at least one of the one or more concentrations of the security and the one or more previously selected securities, storing, in the hardware storage device, the one or more keyed data records structured with data specifying at least one of the one or more increased concentrations.

In some implementations, the BBSI constraints specify: the BBSI has ten or more component securities; no single component security comprises more than 30 percent of the index's weighting; the five highest weighted component securities together comprise no more than 60 percent of the index's weighting; and the lowest weighted component securities comprising, in the aggregate, 25 percent of the index's weighting have an aggregate dollar value of average daily trading volume (ADTV) of $50 million or more (or in the case of an index with 15 or more component securities, $30 million or more).

In some implementations, the method further comprises: generating, by the data processing system, a test in which a plurality of test subjects construct respective test subject specific broad-based security indexes (BBSIs), with each test subject corresponding to one or more data structures ("test subject data structures") stored in a hardware storage device, wherein the test has a start time, an end time, and a predetermined monetary budget for the test subject specific BBSIs, wherein the method includes: prior to the start time, generating, by the data processing system, a graphical user interface with a plurality of input controls for receiving input specifying one or more securities from a pre-specified selection universe for inclusion in the test subject specific BBSI, with the graphical user interface being accessible before the start time and being inaccessible after the start time; and for a particular test subject data structure, upon receipt of input from the input controls, updating the test subject data structure with data specifying names of selected securities and concentrations of selected securities; determining whether a conflict exists among concentrations of securities in the test subject data structure and the BBSI constraints; and if a conflict exists, receiving input to resolve the conflict; and at the end time, determining a rank ordering of the test subject data structures in accordance with respective monetary values of the test subject data structures.

In some implementations, the BBSI constraints specify: the BBSI has nine or more component securities; no single component security comprises more than 30 percent of the index's weighting; all of the component securities are registered under section 12 of the Exchange Act; and each component security is both one of the 750 securities with the largest market capitalization and one of the 675 component securities with the largest dollar value of the average daily trading volume ("ADTV").

In some implementations, the method further comprises: prompting, through the graphical user interface, the test subject to select a prepopulated template from one or more prepopulated templates, where each prepopulated template of the one or more prepopulated templates specifies a plurality of concentrations for completing a BBSI for the test subject and that satisfy the constraints for constructing a BBSI; and if the test subject selects the prepopulated template: accessing, from the hardware storage device, a plurality of data records that are structured to specify the plurality of concentrations and, for each of the plurality of concentrations, a respective security that is to be selected by the test subject; prompting the test subject, through the graphical user interface, to select, for each of the plurality of concentrations, a respective security for the concentration from a set of securities that satisfy the BBSI constraints; receiving, through the graphical user interface, selection data specifying selection of a visual representation of the selected respective securities, with the selection data being associated with the key that uniquely identifies the test subject associated with the selection data; parsing, by the parser of the data processing system, the plurality of data records to identify, based on the structure, data specifying the selected respective securities and data specifying the plurality of concentrations; and storing, in the hardware storage device, the plurality of keyed data records structured with data specifying the plurality of selected securities and the plurality of concentrations.

In some implementations, the one or more prepopulated templates include a maximally concentrated template. In some implementations, the one or more prepopulated templates include an equally concentrated template. In some implementations, the method further comprises: accessing, from an external hardware storage device, real time market data specifying at least, for each security in a security market, a respective price history, a respective trade volume history, and a respective market capitalization; processing the real time market data to determine, for each security in the security market, a respective average daily trading volume ("ADTV") for the security and a respective correlation coefficient for the security with respect to at least one of the security and the one or more previously selected securities ("real time data"); and based on the parsed data and the real time data, determining, by the data processing system, whether a conflict exists among the concentration of the security with respective concentrations of the previously selected securities and the BBSI constraints.

The following are some of the additional features within this aspect.

Other aspects include computer program products tangibly stored on non-transitory computer readable media and computation systems such as computer systems and computer servers.

In a stock selecting test, test subjects can indicate an interest (through setting selection) in the mathematical concentration of their respective component holdings and also an interest in the variance of the respective stream of expected returns. Other things being equal, a portfolio with a higher variance of expected returns is to be preferred. In other test settings, maximizing the variance of expected return streams is relatively easy; however, in stock selecting tests that task is not susceptible to unaided calculation in the human mind. In some embodiments, the term "stock" or "security" can also include other types of assets, including without limitation cryptocurrencies, so long as the BBSI boundary conditions continue to be met for all test subject portfolios.

With a security selection universe of thousands of securities, and the permissibility of test subjects taking long or short positions with respect to each security, it exceeds the computational capability of any human to track all of the bilateral cross correlations that would be required to sort securities in descending order based on the absolute value of their cross-correlation with a security previously chosen by a test subject.

Based on the first security chosen, and each security sequentially after the first, the system can display in real-time and ranked in descending order, the other 6000 securities and their 6-month trailing Pearson correlation coefficient with the chosen security. This information can be immediately available no matter which of the available 6000 stocks the test subject initially selects, so the precise 6000 cross-correlations can be selected immediately from the 18,000,000 cross-correlations in the stock selection universe, then ranked in descending order, and presented in real-time to the test subject;

The disclosed methods herein generate a user interface that enables test subjects to build maximally concentrated portfolios that do not breach any of the broad-based security index ("BBSI") boundary conditions. The constrained optimization problem presented by the simultaneous need to satisfy the BBSI conditions with the conflicting aim of creating the most concentrated index is based on complex patterns and correlations well beyond what could be analyzed by a human or solely in the human mind. Other features and advantages of the invention will become apparent from the following description, and from the claims.

DETAILED DESCRIPTION

Figure 1:
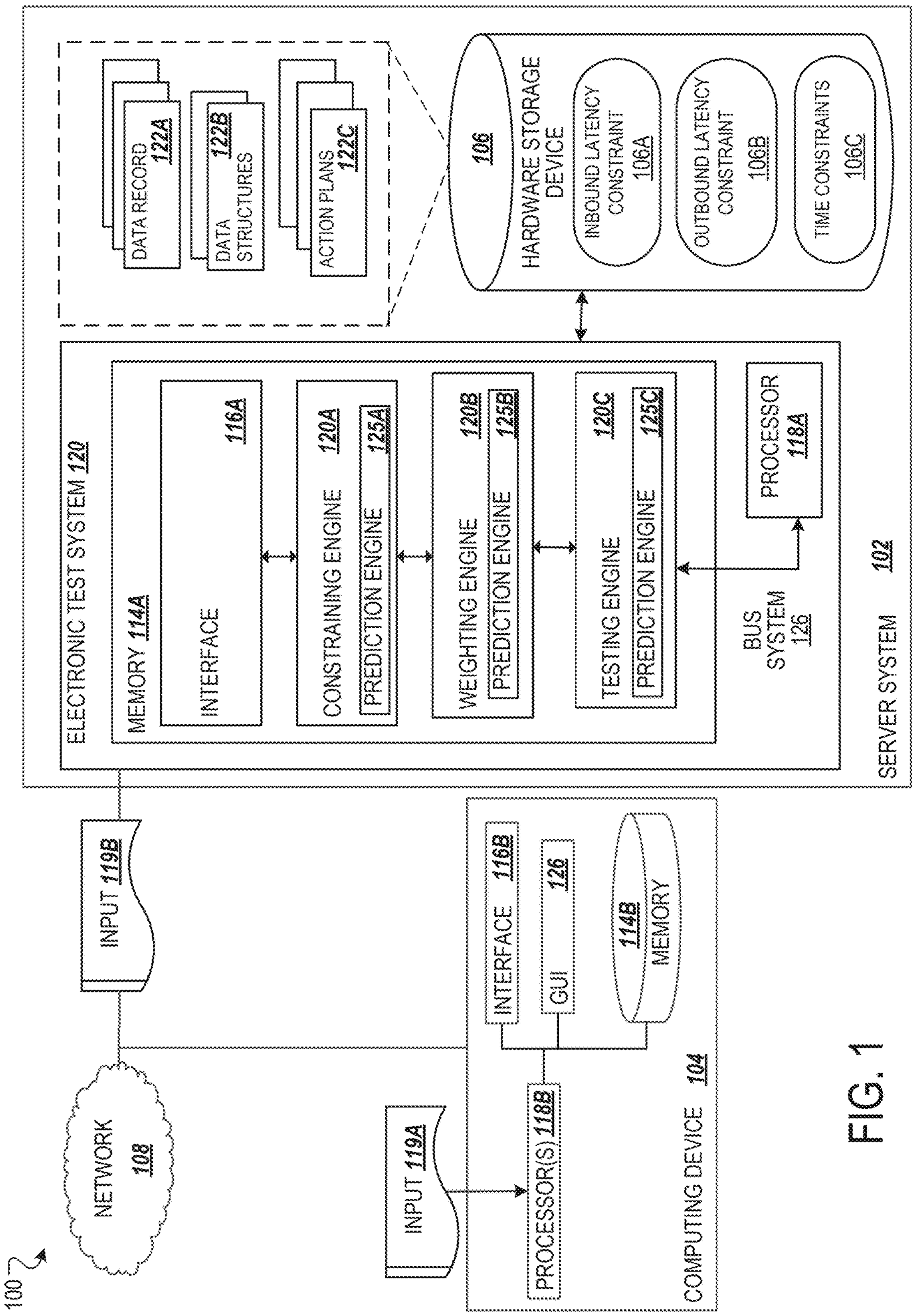
FIG. 1 depicts an example of a system for processing digital data to construct a maximally concentrated Broad-Based Security Index.

The system described herein facilitates the construction of Broad-Based Security Indexes that do not constitute security-based swaps. In particular, this description relates to processing digital data for inbound and outbound latency leveling in an electronic test environment, to construct a maximally concentrated Broad-Based Security Index.

Traditional trading environments configured to facilitate tests of fundamental asset analysis capabilities enable test subjects to move in and out of positions in real time during the test based on processing capabilities, providing an unfair advantage to the computing systems that have a superior computational power or present system architecture speed advantages. Addressing limitations of traditional trading environments, the described implementations provide inbound and outbound latency leveling by imposing latencies that regulate the positions of the computing systems participating in tests of fundamental asset analysis capabilities, to mitigate the impact of disparities in computational power.

A security index ("index" or "portfolio") includes a set of multiple securities ("securities" or "component securities"). A maximally concentrated security index includes a security index in which a concentration of one or more securities in the security index is increased, relative to an original concentration of that security, while complying with one or more constraints. Generally, a concentration of a security in an index includes a share of the index allocated to the security, e.g., represented by a percentage of the total monetary value of the index. The present disclosure includes a system that enables test subjects to easily construct competitive security indices that serve the criteria of: 1) satisfying the Commodity Futures Trading Commission's (CFTC) definition of Broad-Based Security Index ("BBSI"); 2) maximizing the concentration of such security indices without violating the boundary conditions of a BBSI; and 3) maximizing the variance of the expected return stream of an index based on correlations between the highest weighted security or securities and all other securities in the selection universe.

The system, through a graphical user interface, receives a security index associated with a test subject that includes one or more securities, and determines whether the security index complies with the one or more BBSI constraints. In response to the determination, the system generates a graphical user interface that includes, for each security in the security index, a respective range of concentrations for the security that comply with the one or more BBSI constraints. The test subject can select, through the graphical user interface and for each security, a concentration for the security from the respective range of BBSI-compliant concentration values. Selecting the maximum concentration from each range of concentrations corresponds to constructing a BBSI-compliant, maximally concentrated security index that includes the same securities as the original BBSI associated with the test subject.

The simultaneous need to satisfy the BBSI boundary conditions with the conflicting aim of creating the most concentrated index is a constrained optimization problem that is based on complex patterns and correlations well beyond what could be analyzed by a human or solely in the human mind. Solving the constrained optimization problem and generating a user interface for the test subject to select BBSI-compliant concentrations for the securities enables the test subject to more easily construct compliant BBSIs.

The methods described herein can be performed locally on any appropriate data processing device, e.g., a central processing unit ("CPU"), a graphical processing unit ("GPU"), or a tensor processing unit ("TPU"), or distributed across multiple appropriate data processing devices, e.g., on a cloud computing system. Performing the methods on, e.g., a GPU, can accelerate the speed at which streamed data is processed to construct the BBSI-compliant, maximally concentrated portfolio, which can enable more real-time simulations and pricing decisions and performance tracking to be executed in real time with regard to real time data. The speed at which streamed data is processed is accelerated, relative to the speed at which streamed data is processed using a standard processor or processing unit.

FIG. 1 shows an example system 100 for processing digital data to control inbound and outbound latency and construct a maximally concentrated Broad-Based Security Index. The system 100 is an example of a system implemented as computer programs on one or more computers in one or more locations in which the systems, components, and techniques described below are implemented.

The illustrated example system 100 includes or is communicably coupled with a server system 102, a computing device 104, and a network 108. Although shown separately, in some implementations, functionality of two or more systems or components of the example system 100 can be provided by a single system or server. In some implementations, the functionality of one illustrated system, server, or component can be provided by multiple systems, servers, or components, respectively.

In the example of FIG. 1, the server system 102 is intended to represent various forms of servers including, but not limited to a web server, an application server, a proxy server, a network server, and/or a server pool. In general, the server system 102 manages inbound and outbound latency for management of electronic test orders received from any number of components of the example system 100 including any number of computing devices 104 (e.g., over the network 108). In accordance with implementations of the present disclosure, and as noted above, the server system 102 can host a solution environment that can be a cloud environment providing software applications, systems, and services that can be consumed by customers as a service. In some instances, the server system 102 can support configuring of various tenants of different types, as well as services of different types that are integrated in customer integration scenarios and support execution of defined processes.

The server system 102 includes a memory 114A, an interface 116A, a processor 118A, and an electronic test system 120. The memory 114A can store data (e.g., inputs and outputs of the electronic test system 120), such as data records 122A, data structures 122B, and action plans 122C.

The data records 122A can include data that can be received from the computing device 104. For example, the data records represent at least in part the selection data specifying a test subject's interaction and/or selection of one or more portions of a respective graphical user interface 126 and/or one or more visual representations in a graphical user interface 126. Generally, the data records 122A include data identifiers that uniquely identify one or more properties of the associated data, e.g., that uniquely identifies a test subject associated with the data.

The data structures 122B can include data structure constraints for managing inbound and outbound latency and constructing a BBSI. The multiple constraints can represent one or more sets of boundary conditions as defined by the CFTC. In this example, the data structures 122B specify the BBSI constraints that are stored in hardware storage device 106 as a set of nodes, with each data structure representing a node and a value of a node representing a BBSI constraint. In the illustrated example, the nodes themselves include structured data. Generally, structured data includes data that has been organized into a formatted repository, typically a database, so that its elements can be made addressable for more effective processing and analysis. Given the structure of this data, a data processing system can process this structured data with reduced latency, relative to the latency required to process large volumes of unstructured data. Because the data itself has a pre-specified structure, the parser can quickly identify certain types of data. Additionally, certain portions of the data may reference or point to other data structures. Because the data is structured, the electronic test system 120 can efficiently look up references to other portions of data, which can be analyzed, by the electronic test system 120.

In some implementations, an alert generation defined by the action plans 122C can also point to latency regulations set within the example system 100 (e.g., regulations adjusted to manage latency by the electronic test system 120). The action plans can include action plan documents defining parameters of operations that can be performed by the components of the electronic test system 120 to balance detected or estimated uneven processing of electronic test orders by the electronic test system 120. The electronic test system 120 can process data records 122A and data structures 122B, obtained from the hardware storage device 106, using the constraining engine, the weighting engine, and the testing engine to manage latency according to the action plans 122C. For example, the electronic test system 120 can control a lock of portfolio rebalancing electronic test orders that neutralizes a potentially unfair advantage that can be gained by computing devices 104 with top ranking computational power or speed, enabling a fair distribution of portfolios, independent of the computational power or speed of the computing systems participating in a portfolio rebalancing test. The fair distribution of portfolios is based on inbound latency leveling and outbound latency leveling implemented by the electronic test system 120.

The computing device 104 (e.g., test subject device) can be any computing device operable to connect to or communicate in the network(s) 108 using a wireline or wireless connection. In general, the computing device 104 includes an electronic computer device operable to receive, transmit, process, and store any appropriate data associated with the example system 100 of FIG. 1. The computing device 104 is generally intended to encompass any client computing device such as a laptop/notebook computer, wireless data port, smart phone, personal data assistant (PDA), tablet computing device, one or more processors within these devices, or any other suitable processing device. The computing device 104 includes an interface 116B, processor(s) 118B, and memory 114B.

The computing device 104 includes a graphical user interface (GUIs) 126. For example, the GUI 126 includes an input device, such as a keypad, touch screen, or other device that can accept user information, and an output device that conveys information associated with the electronic test orders to the server system 102, or the client device itself, including taking control of latency leveling. The GUI 126 can interface with at least a portion of the example system 100 for any suitable purpose, including generating a visual representation of the processed electronic test order and other data generated by the server system 102, or data stored by the server system 102, such as data records 122A, data structures 122B, and action plans 122C, respectively. In particular, the GUI 126 can be used to view and adjust various latency leveling management operations. Generally, the GUI 126 can provide the user with an efficient and user-friendly presentation of an indication of one or more additional electronic test orders that are candidates for selection that satisfy one or more boundary conditions of the electronic test environment provided by or communicated within the example system 100. The GUI 126 can include multiple customizable frames or views having interactive fields, pull-down lists, and buttons operated by the user. The GUI 126 can be any suitable graphical user interface, such as a combination of a generic web browser, intelligent engine, and command line interface (CLI) that processes information and efficiently presents the results to the user visually.

In some implementations, the network 108 can include a large computer network, such as a local area network, a wide area network, the Internet, a cellular network, a telephone network or an appropriate combination thereof connecting any number of communication devices, mobile computing devices, fixed computing devices and server systems. Data exchanged over the network 108, is transferred using any number of network layer protocols, such as internet protocol, multiprotocol label switching, asynchronous transfer mode, frame relay, etc. Furthermore, in implementations where the network 108 represents a combination of multiple sub-networks, different network layer protocols are used at each of the underlying sub-networks. In some implementations, the network 108 represents one or more interconnected internetworks, such as the public Internet.

Each processor 118A, 118B included in different components of the example system 100 can include a central processing unit (CPU), an application specific integrated circuit (ASIC), a field-programmable gate array (FPGA), or another suitable component. Generally, each processor 118A, 118B executes instructions and manipulates data to perform inbound and outbound latency leveling.

Interfaces 116A, 116B are used by different components of the example system 100 for communicating with other component systems in a distributed environment-including within the example system 100-connected to the network 108. Generally, the interfaces 116A, 116B each include logic encoded in software and/or hardware in a suitable combination and operable to communicate with the network 108. More specifically, the interfaces 116A, 116B can each include software supporting one or more communication protocols associated with communications such that the network 108 or interface's hardware is operable to communicate physical signals within and outside of the illustrated system 100.

The memory 1114A, 114B can include any type of memory or database module and can take the form of volatile and/or non-volatile memory including, without limitation, magnetic media, optical media, random access memory (RAM), read-only memory (ROM), removable media, or any other suitable local or remote memory component. The memory 1114A, 114B can store various objects or data, including caches, classes, frameworks, applications, backup data, business objects, jobs, web pages, web page templates, database tables, database queries, repositories storing safety data and/or dynamic information, and any other appropriate information including any parameters, variables, algorithms, instructions, rules, constraints, or references thereto associated with the purposes of the server system 102 and the computing device 104, respectively.

There can be any number of computing devices 104 associated with, or external to, the example system 100. Additionally, there can also be one or more additional client devices external to the illustrated portion of system 100 that are capable of interacting with the example system 100 via the network(s) 108. Further, the term "a test subject device."

"client," "client device," and "user" can be used interchangeably as appropriate without departing from the scope of the disclosure. Moreover, while client device can be described in terms of being used by a single user, the disclosure contemplates that many users can use one computer, or that one user can use multiple computers. As used in the present disclosure, the term "computer" is intended to encompass any suitable processing device. For example, although FIG. 1A illustrates a single server system 102 and a single computing device 104, the example system 100 can be implemented using a single, stand-alone computing device, two or more server systems 102, or multiple client devices. The server system 102, the computing device 104 and the output reporting system 112 can include any computer or processing device. According to one implementation, the server system 102 can also include or be communicably coupled with an e-mail server, a Web server, a caching server, a streaming data server, and/or another suitable server, as described with reference to FIG. 2.

In some implementations, the example system 100 can be used to construct a maximally concentrated security index that satisfies the CFTC's definition of a BBSI. In general, the system 100 in this implementation is based on a graphical user interface 126 rendered on a display of client device 104, the server system 102, and/or the hardware storage device 106.

In general, the system 100 can process selection data representing multiple securities and respective concentrations. For convenience, the system will be described as processing a security and a concentration of the security. The security can include a "current" security that is a security most recently selected by the test subject interacting with the graphical user interface 126.

The graphical user interface 126 is configured to receive input 119A and transmit the (processed) input 119B to the electronic test system 120. The input 119A, 119B includes the selection data associated with the key that uniquely identifies a test subject associated with the selection data. The graphical user interface 126 can be displayed on a client device 104, e.g., a mobile device, a tablet, or a computer, and the input 119A can be selected by the test subject interacting with the graphical user interface 126. For example, the selection data 110 can represent selection of a visual representation of the security and the concentration of the security. The concentration can represent, e.g., a percentage allocation for the security of a total monetary value of the index.

The electronic test system 120 is configured to access from the hardware storage device 106 one or more data records 122A that are encrypted using the key. The key can include a locking mechanism generated by an encryption engine to protect sensitive data records 122A from being misappropriated. The encryption engine can include an apparatus, module, engine, object, library, and/or the like that is embodied as software, hardware, and/or a combination of software and hardware and is configured to facilitate encryption and decryption, including encryption key generation, rotation, storage, and management of encryption and decryption keys. The one or more data records 122A are structured to specify one or more previously selected securities 106*a* and one or more respective concentrations of the one or more previously selected securities. For example, each data record can be structured to include one or more fields.

In one example of the data record 122A can correspond respectively to a field A, a field B, a field C, and a vector (or other type of data structure 122B) of numerical values. The field A can specify the key that uniquely identifies the test subject associated with the selection data, e.g., represented by a unique alphanumeric or integer sequence. The field B can specify the previously selected security represented by the data record, e.g., represented by a character sequence corresponding to the name or ticker symbol of the security, or a unique numerical sequence identifying the security. The field C can specify a long flag for the security that indicates a long position in the security, or a short flag for the security that indicates a short position in the security, e.g., represented by an alphanumeric sequence, or, respectively, a 0 or a 1. The vector can specify the concentration of the previously selected security, e.g., a 20% concentration of security ABC. Generally, a long position includes a position in the security that will gain in value when the market price of the security rises, and a short position includes in a position in the security that will gain in value when the market price of the security falls. Generally, a market price ("price") or market value ("value") of a security is determined in a securities market, where a security market ("market") is a market in which securities are bought and sold.

In one example, for a portfolio with a monetary value of $1,000,000, a 20% concentration of a security ABC corresponds to an allocation of $200,000 for security ABC.

The electronic test system 120 is configured to access from the hardware storage device 106 one or more data structures 118 that specify multiple constraints 106*b* for constructing a BBSI. The multiple constraints can represent one or more sets of boundary conditions as defined by the CFTC. In this example, the data structures 118 specifying the BBSI constraints 106*b* are stored in hardware storage device 106 as a set of nodes, with each data structure representing a node and a value of a node representing a BBSI constraint. In this example, the nodes themselves are structured data. Generally, structured data includes data that has been organized into a formatted repository, typically a database, so that its elements can be made addressable for more effective processing and analysis. Given the structure of this data, a data processing system can process this structured data with reduced latency, relative to the latency required to process large volumes of unstructured data. Because the data itself has a pre-specified structure, the parser can quickly identify certain types of data. Additionally, certain portions of the data may reference or point to other data structures. Because the data is structured, the parser can efficiently look up references to other portions of data.

For example, whenever a test subject selects a security, the bundle of information about that security that is pulled from the pre-structured data repository must include, at a minimum: 1) the trailing market capitalization of that security and where it ranks in the pre-sorted list of all securities in the selection universe; 2) the trailing ADTV of that security; 3) the 6000 trailing cross-correlations of that security's price with the prices of all other securities in the selection universe; and 4) The event-based predictions from the trained machine learning engine that indicate which securities are likely candidates for high variance during the test period based on upcoming data releases on interest rates, employment, sector-specific consumer price index, and company-specific earnings announcements. The trailing market capitalization of each security and the respective ranking are used to determine whether or not each component security is both one of the 750 securities with the largest market capitalization and one of the 675 component securities with the largest dollar value of the average daily trading volume ("ADTV"). The trailing ADTV of the security is required to determine whether "the lowest weighted component securities comprising, in the aggregate, 25 percent of the index's weighting have an aggregate dollar value of average daily trading volume (ADTV) of $50 million or more (or in the case of an index with 15 or more component securities, $30 million or more)." The 6000-trailing cross-correlations are used to level the inbound information latencies associated with maximizing the expected variance of test subject return streams instantaneously based on their initial security selection(s). The event-based predictions are used for inbound information latency leveling to provide the test subjects with the same expected variance maximization information at the same time.

As described in further detail below, these constraints can be broken up into various sets. The electronic test system 120 receives input (over an input port of electronic test system 120) specifying which set is to be applied to a constructed index (and/or an index being constructed). Based on the specified set, electronic test system 120 traverses the nodes stored in hardware storage device 106 to identify which nodes are applicable to a given set. In some examples, the nodes are labeled to specify which set the nodes belong to. In other examples, the contents of the nodes themselves specify which sets the node belongs to. Based on the identified nodes, the electronic test system 120 extracts values or contents from the nodes—with the extracted values being in the form of constraints—and applies the constraints to the index being constructed.

In one example, the constraints can include a "set A" of boundary conditions that specify i) the BBSI has ten or more component securities, ii) no single component security comprises more than 30 percent of the index's weighting, iii) the five highest weighted component securities together comprise no more than 60 percent of the index's weighting, and iv) either the lowest weighted component securities comprising, in the aggregate, 25 percent of the index's weighting have an aggregate dollar value of average daily trading volume ("ADTV") of $50 million or more, or, in the case of an index with 15 or more component securities, $30 million or more. Generally, an ADTV of a security includes the average daily dollar volume of shares traded during a certain period of time, e.g., during a month, six months, or a year. The dollar value of ADTV includes the value in dollars of the number of shares traded during the reference period divided by the number of trading days in that reference period.

In another example, the constraints can include a "set B" of boundary conditions that specify i) the BBSI has nine or more component securities, ii) no single component security comprises more than 30 percent of the index's weighting, iii) all of the component securities are registered under section 12 of the Exchange Act, and iv) each component security is both one of the 750 securities with the largest market capitalization and one of the 675 component securities with the largest dollar value of the ADTV. Generally, a market capitalization of a security includes a monetary value of the security, e.g., determined by multiplying the total number of shares by a price per share of the security.

In yet another example, the constraints can include both the set A of boundary conditions and the set B of boundary conditions, where a security index can satisfy either set A or set B, or both.

The electronic test system 120 is configured to parse the one or more data records 122A. Based on the structure of the one or more data records 122A, the electronic test system 120 can identify data specifying the one or more previously selected securities and the respective concentrations of the one or more previously selected securities represented by the one or more data records 122A. That is, each data record includes structured data. The electronic test system 120 parses the structured data to identify which data is to be applied, e.g., to the constraints. For example, the fields 117*a-d* can each be of a respective fixed length, e.g., a respective fixed number of bits. The electronic test system 120 can identify the data by parsing each respective fixed length of data and associating the respective data with the corresponding key, security, long or short flag, or concentration of the security.

The electronic test system 120 can include a prediction engine 125A. The prediction engine 125A can perform identification of the data records 122A to automatically determine data structures using time-series data patterns. The time-series data patterns can include movements of individual security/asset values in response to periodic, repeating external parameters in the form of informational reports.

In another example, the fields 117*a-d* can be of variable lengths, and separated by unique separate tokens, e.g., a unique sequence of bits that represents that one element ends and the next begins. The electronic test system 120 can parse the data record and identify the respective data between the separate tokens. The electronic test system 120 is configured to access from the external hardware storage device 107 real time market data 107*a* that specify at least, for each security in a security market, a respective price history, a respective trade volume history, and a respective market capitalization.

Generally, a price history of a security includes a price of the security at each of multiple time points over a period of time, e.g., daily opening, closing, high, and low prices over e.g., a month, six months, or a year.

Generally, a trade volume for a security includes a total number of shares of the security that were traded during a given period of time, e.g., a day, a week, or a month, and a trade volume history includes the trade volume at each of multiple time points over a period of time, e.g., a daily trading volume over a month, six months, or a year.

The electronic test system 120 can transmit a request to the external hardware system 107, and the external hardware storage device 107 can determine the real time market data 107*a*, e.g., based on the time that the request is received by the external storage device 107. The external hardware storage device 107 can transmit an input 119 that includes the real time market data 107*a* to the electronic test system 120. The communication can happen over a network, e.g., the internet or other network, as described in further detail below with respect to FIG. 2.

The electronic test system 120 can process the real market data 107*a* included in the input 119 to determine, for each security in the market, the respective ADTV of the security, a respective market capitalization of the security, and a respective correlation coefficient of the security with respect to each of one or more of the security and the one or more of the previously selected securities (to determine "real time data" for the securities). The correlation coefficients can include, e.g., the bivariate correlation coefficient between two respective securities.

For example, the electronic test system 120 can determine the respective ADTVs as a time average of the trading volume over a predetermined time period from the past until the present, e.g., the past month, six months, or year. The electronic test system 120 can determine the respective correlations using any appropriate method, e.g., Pearson's correlation coefficient formula.

After the test subject has selected the final portfolio component security, the system can instantaneously calculate whether either the lowest weighted component securities comprising, in the aggregate, 25 percent of the weighting of the index product have an aggregate dollar value of average daily trading volume ("ADTV") of $50 million or more, or, in the case of an index product with 15 or more component securities, $30 million or more;

In one example, the electronic test system 120 can determine the respective correlation coefficients with respect to the security.

In another example, the electronic test system 120 can determine a respective set of correlation coefficients for each security in the market with respect to each of one or more of the electronic test orders (e.g., security) and the previously selected securities with the highest concentrations. The electronic test system 120 can determine a respective set of correlation coefficients for the most highly concentrated security, for each of the two securities with the two highest respective concentrations, and so on.

The test engine 120C is configured to process the selection data 110, the parsed data identified in the data records 122A, the real time data derived from the real time market data 107*a*, and the BBSI constraints 106*b* represented by the data structures 118, and to determine whether there is a conflict among the concentration of the security with the concentrations of the one or more previously selected securities according to the BBSI constraints. Generally, a conflict happens when one or more securities violate one or more BBSI constraints.

The test engine 120C can process these data and data structures to determine if they satisfy at least one of the one or more sets of constraints, e.g., satisfy either set A or set B, or both. If one or more of the constraints are violated, the electronic test system 120 can prompt the test subject to resolve the conflict, as described below. For example, the test engine 120C can process these data for each set of constraints in parallel, in series, or in a decision tree.

In one example, the test engine 120C can process these data to determine if they satisfy the constraints for set A in the following order. The test engine 120C can determine if each security is unique, and, if not, combine the concentrations of any duplicate securities. The test engine 120C can then determine, for the respective concentration of each security, if the concentration is equal to or less than 30, as $$1 \le s_i \le 30, \tag{1}$$

where i indexes the securities in the security index, and $s_i$ is the concentration of security i, e.g., represented by a positive integer. If equation (1) is satisfied, the test engine 120C can rank order the concentrations in descending order so that for each concentration, $$s_i \ge s_{i+1}. \tag{2}$$

If equation (2) is satisfied, the test engine 120C can determine if the portfolio contains at least five securities. If the portfolio contains at least five component securities, the test engine 120C can determine whether the cumulative concentration of the five component securities with the highest concentrations is less than or equal to sixty, as $$\sum_{i=1}^{5} s_i \le 60. \tag{3}$$

If equation (3) is satisfied, the test engine 120C can determine if there are between ten and one hundred component securities in the index, as $$10 \le n \le 100, \tag{4}$$

where n is the number of component securities, e.g., including the security and the one or more previously selected securities. If equation (4) is satisfied, the test engine 120C can determine if the cumulative concentration of the concentrations of the securities is equal to one hundred, as $$\sum_{i=1}^{n} s_i = 100. \tag{5}$$

If equation (5) is satisfied, the test engine 120C can determine, using the real time data, if either the lowest weighted component securities comprising, in the aggregate, 25 percent of the index's concentration have an aggregate dollar value of ADTV of $50 million or more, or, in the case of an index with 15 or more component securities, $30 million or more.

In one example, the test engine 120C can process these data to determine if they satisfy the constraints for set B in the following order. The test engine 120C can determine if each security is unique, and, if not, combine the concentrations of any duplicate securities. The test engine 120C can then determine, for each concentration, if the concentration is equal to or less than 30, as $$1 \le s_i \le 30, \tag{6}$$

where i indexes the securities in the security index, and $s_i$ is the concentration of security i, e.g., represented by a positive integer. If equation (6) is satisfied, the test engine 120C can determine if there are between nine and one hundred component securities in the index, as $$9 \le n \le 100, \tag{7}$$

where n is the number of securities, e.g., including the security and the one or more previously selected securities. If equation (7) is satisfied, the test engine 120C can determine if the cumulative concentration of the concentrations of the securities is equal to one hundred, as $$\sum_{i=1}^{n} s_i = 100. \tag{8}$$

If equation (8) is satisfied, the test engine 120C can determine, using the BBSI constraints 106*b*, if all of the component securities are registered under section 12 of the Exchange Act. If all of the component securities are registered under section 12 of the Exchange Act, the test engine 120C can determine, using the real time data, if each component security is both one of the 750 securities with the largest market capitalization and one of the 675 component securities with the largest dollar value of the ADTV.

In one example, the test engine 120C can process these data to determine if they satisfy the constraints in the following order. The test engine 120C can determine if the securities are unique within the portfolio, and combine any concentrations of securities that have been selected more than once. The test engine 120C can determine if the respective concentration of each security is between 1% and 30%. The test engine 120C can determine whether there is a minimum of nine securities for set B BBSI constraints, or ten securities for set A BBSI constraints. The test engine 120C can determine if the five securities with the highest concentrations have a cumulative concentration of 60% or less. The test engine 120C can determine, for the securities with the lowest concentrations, whether the ADTV calculations meet the BBSI requirements. The test engine 120C can determine if all the securities are found to be in the set B allowable securities, and evaluate only set B BBSI constraint-specific criteria without having to satisfy set A BBSI constraints.

In one example, the test engine 120C can process these data to determine if they satisfy each set of constraints in parallel. The test engine 120C can determine concurrently if the data satisfy the set A of constraints and if the data satisfy the set B of constraints.

In another example, the test engine 120C determines whether these data satisfy the different sets of constraints in series. The test engine 120C can process the data to determine if they satisfy set A. If they fail to satisfy set A, the test engine 120C can process the data to determine if they satisfy set B.

In another example, the test engine 120C can process the data as part of a decision tree. The test engine 120C can determine the number of component securities. If the number of component securities is nine, the test engine 120C can determine if the data satisfy set B constraints. If the number of component securities is ten or greater, the test engine 120C can determine the sum of the concentrations of the five component securities with the highest concentrations. If sum is greater than sixty percent, the test engine 120C can determine if the data satisfy set B. Otherwise, the simulation engine can determine if the data satisfy either set A or set B.

The electronic test system 120 can transmit, through the bus system 126 to the processing device 128, the instructions from the electronic test system 120 to parse the data, instructions to determine the real time data, and instructions from the test engine 120C to determine if the parsed data satisfy the constraints with the real time data. The processing device 128 can perform operations according to the instructions and transmit the result of the operations back through the bus system 126 to memory 114A.

The electronic test system 120 can include a constraining engine 120A, a weighting engine 120B, and a testing engine 120C that can each include a prediction engine 125A, 125B, 125C, respectively. The constraining engine 120A can generate and constrain tests based on input specified for the input test portions and input weighting portions comprised in graphical user interfaces rendered on the client devices, with a test, for a given client device, comprising testing events specified by input test portions rendered on a graphical user interface displayed on the given client device. If the constraining engine 120A determines that there is a conflict, the prediction engine 125A can process the constraints to be applied to automatically resolve the determined conflicts. The weighting engine 120B can generate an associated weight specified by an input weight portion juxtaposed to a respective input test portion, with each of the tests being equally constrained in accordance with the one or more boundary conditions specifying a criteria for the testing events to satisfy to be comprised in the test, the time constraint, the inbound latency constraints and the outbound latency constraint to control a transmission of electronic test orders from the client devices independent of computational powers of the client devices. The prediction engine 125B can process the weights specified by an input weight portion juxtaposed to a respective input test portion and adjust the weights to optimize latency leveling. The testing engine 120C configured, upon determining that each of the tests complies with the one or more boundary conditions, the time constraint, the inbound latency constraints and the outbound latency constraint, to conduct the tests and determine performances of the tests relative to each other. The prediction engine 125C can generate a sequence of tests to optimize performances of the tests relative to each other.

In some implementations, if the electronic test system 120 determines that there is a conflict, the electronic test system 120 prompts, through the graphical user interface 126, a test subject for input to resolve the conflict. The electronic test system 120 can send instructions to cause the graphical user interface 126 to display the prompt to the test subject. The test subject can select a visual representation of one or more securities and one or more respective concentrations of the one or more securities, and the graphical user interface 126 can transmit an input representing the selection of the visual representation to the electronic test system 120. For example, the prompt can include a message requesting the test subject to resolve the conflict and a menu including fields to select one or more securities and corresponding fields to select one or more respective concentrations, as described in FIG. 3A below.

When there is no determined conflict, the electronic test system 120 determines whether the concentration of the security or at least one of the one or more concentrations of the previously selected securities can be increased without violating the BBSI constraints. The test engine 120C can process the concentrations of the security and the one or more concentrations of the one or more previously selected securities to determine whether one or more of the concentrations can be increased without violating the BBSI constraints.

For example, the test engine 120C can determine that concentrations in a BBSI-compliant prepopulated template are more concentrated than the concentrations of the security and the one or more previously selected securities.

In another example, the test engine 120C can determine whether a Herfindahl-Hirschman Index ("HHI") of the concentrations of the security and the one or more previously selected securities is maximal subject to the BBSI constraints. Generally, the HHI of the concentrations can be determined as, $$HHI(S) = \sum_{i=1}^{n} s_i^2, \tag{9}$$

where i indexes the component securities, n represents the number of component securities, $s_i$ represents the concentration of component security i (e.g., as a positive integer less than or equal to 100), and S represents the set of concentrations $\{s_i\}$. As illustrative examples, the HHI of a portfolio with a single security with a concentration of 100% is $10000=100^2$, and the HHI of a portfolio with 100 securities with respective concentrations of 1% is $100=100\times1^2$.

The test engine 120C can determine whether the HHI of the component securities is less than an HHI of a pre-determined maximally concentrated portfolio that 1) includes a number of securities equal to n and 2) is BBSI-compliant (e.g., if n equals 9, the concentrations are still less than 30%, the concentrations sum to 100, etc.). In response to determining that the HHI of the component securities is less than the HHI of the pre-determined maximally concentrated portfolio, then the test engine 120C can determine that one or more of the concentrations can be increased.

As illustrative examples for maximally concentrated portfolios subject to set A constraints, the HHI of a portfolio with 45 securities is $1672=30^2+27^2+43\times1^2$.

As illustrative examples for maximally concentrated portfolios subject to set B constraints, the HHI of a portfolio with nine securities $2730=30^2+30^2+30^2+52+5\times1^2$.

In another example, the test engine 120C can determine if the security with the highest concentration can be increased without violating the BBSI constraints. Then, the test engine 120C can determine if the security with the second highest concentration can be increased without violating the BBSI constraints, and on until the concentration of no security can be increased without violating the BBSI constraints.

In another example, the test engine 120C can determine whether the sum of the concentrations of the five securities with the highest concentrations is below 60 percent, and, if the sum is below 60 percent, increase the respective concentrations until the sum is 60 percent. The test engine 120C can begin by determining whether the concentration of the security with the highest concentration is below 30 percent of the highest weighting. If the concentration is below 30 percent, the test engine 120C can increase the concentration to 30 percent, while keeping the sum of the concentrations of the five securities equal to or below 60 percent.

In another example, the test engine 120C can determine under which set of constraints, e.g., set A or set B, the concentrations of the component securities, e.g., both the security and the previously selected securities, can be most concentrated. For instance, if the security and the previously selected securities satisfy both sets of constraints, the data processing system can determine that set B can allow for a higher concentration of the highest weighted component securities, since set A requires that the five highest weighted component securities together comprise no more than 60 percent of the BBSI's weighting. The electronic test system 120 can then prompt the test subject to increase the concentrations of one or more of the component securities while satisfying the boundary conditions of set B without satisfying set

A.

In another example, the test engine 120C can use any appropriate combination of the methods described above to determine if the concentrations can be increased.

In some implementations, the prediction engine 125A, 125B performs data processing (e.g., parsing and simulation) based on trainable artificial intelligence models, such as trainable machine learning models, which map data patterns or context data to parse the data or resolve conflicts, respectively. The machine learning models can be trained using as input a training dataset with labeled data patterns and labeled logs or resolved conflicts. Automatic data processing, by the prediction engine 125A, 125B, based on trained machine learning models can reduce processing complexity and automatically provides consistency across inbound information latency leveling. For example, the prediction engine 125A can be trained to predict parsed data from simple and complex time data patterns of individual security and/or asset prices. The complex time series data patterns include a combination of multiple intricate trends that can be associated with multiple external factors, such as seasonality (e.g., regular patterns that occur at particular times influenced by factors such as holidays, economic cycles, or global events), volatility patterns (e.g., fluctuations over time indicative of increased or decreased risk factors), cyclicality (e.g., recurring patterns that occur over particular time interval associated with entity cycles, such as expansion or contraction processes), intraday patterns (e.g., patterns observed within daily sessions), event based patterns (e.g., events triggered by particular factors and developments).

The time series data patterns and contextual conflicts can be provided to the training system of the prediction engine 125A, 125B as input features, and the parsed-pattern characteristics as well as conflict resolutions can contain values that can be provided to the training system as target outputs. The prediction engine 125A, 125B, during the training phase, can select the type of machine learning model to be trained, e.g., select a predefined or default type of machine learning model, or analyze the input features and the target outputs to identify a particular type of machine learning model. For example, types of machine learning models can include a gradient boosted trees model, a generalized linear model, a support vector machine, a decision tree model, or a neural network model, e.g., a multilayer perceptron (MLP).

The machine learning models can be trained using machine learning training algorithms such as minimizing an error, computing a gradient, or performing backpropagation. In some implementations, the training system can use the metadata corresponding to target data to preprocess the values of the inbound information characteristics to provide to the training system. For example, by using metadata that identifies coexistent events and context information, the prediction engine 125A, 125B can preprocess the data patterns and parsed data such that the training system can more accurately interpret the values. In other words, the prediction engine 125A, 125B can map the conversion values in the cell into encoded representations that can be provided as input features for the training of the machine learning model. For example, the prediction engine 125A, 125B can convert each data set into denoised aggregates and the event-level report data to predict patterns and resolve conflicts in a format that the processing device 128 can interpret, such as for inbound information latency leveling.

The electronic test system 120 stores, in the hardware storage device 106, one or more keyed data records structured with data specifying the concentration of the security.

Figure 3A:
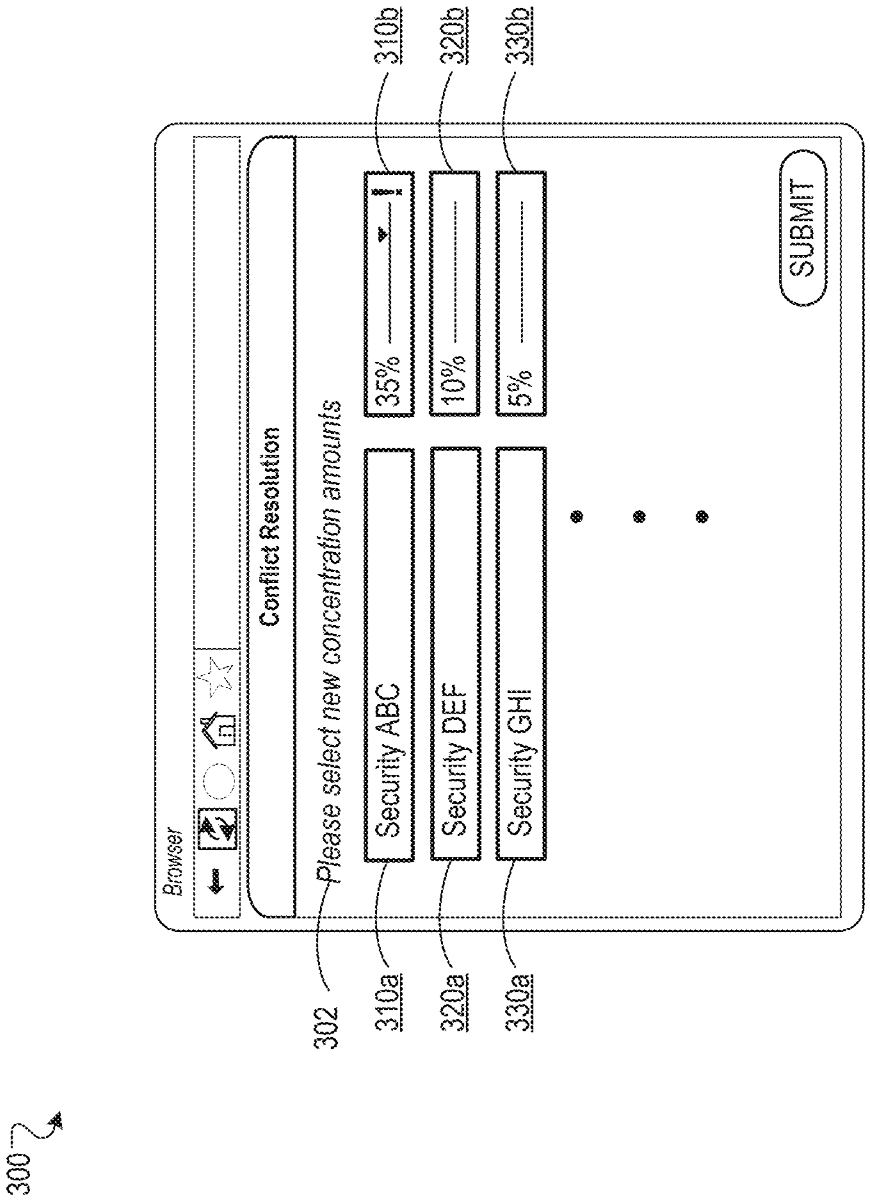
FIG. 3A-B depict examples of graphical user interfaces for conflict resolution and increasing concentrations.
Figure 3B:
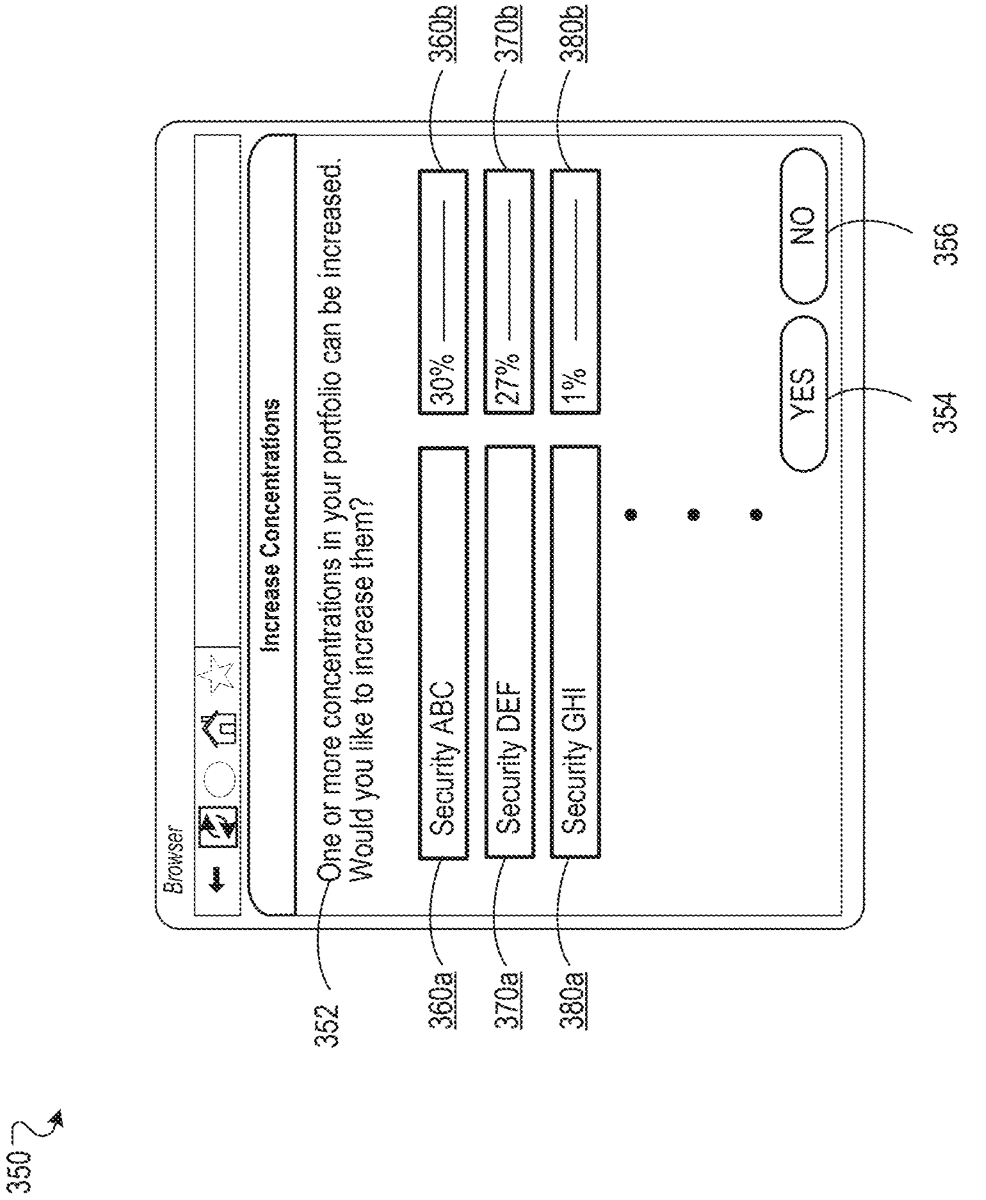

When at least one of the one or more concentrations 106*c* of the security and the one or more previously selected securities can be increased without violating the BBSI constraints, the electronic test system 120 prompts, through the graphical user interface 126, the test subject to increase the at least one of the one or more concentrations of the security and the one or more previously selected securities. The electronic test system 120 can send instructions to cause the graphical user interface 126 to display the prompt to the test subject. The test subject can select a visual representation representing a selection by the test subject to allow the increase of the concentrations, and the graphical user interface 126 can transmit an input representing the selection of the visual representation to the electronic test system 120. For example, the prompt can include a message indicating to the test subject that the concentrations can be increased and a prepopulated template displaying the increased concentrations. An example of a prompt to increase concentrations is shown in FIG. 3B and described below with respect to the description of FIG. 3B.

When the test subject increases the at least one of the one or more concentrations of the security and the one or more previously selected securities, the electronic test system 120 stores, in the hardware storage device 106, one or more keyed data records 130 structured with data specifying at least one of the one or more increased concentrations 106*c*.

Optionally, the data processing system can prompt, through the graphical user interface 126, the test subject to select a prepopulated template from one or more prepopulated templates that each specifies a respective plurality of concentrations that satisfy the BBSI constraints. If the test subject selects a prepopulated template from the one or more prepopulated templates, the electronic test system 120 can access the hardware storage device 106 the respective plurality of concentrations corresponding to the selected prepopulated template, and prompt the test subject, through the graphical interface, to select, for each concentration from the respective plurality of concentrations, a respective security from a predetermined list of securities. Examples of prepopulated templates shown through the graphical user interface 126 are described with respect to FIGS. 4A-B below.

The electronic test system 120 can generate the predetermined list of securities to complete the portfolio 1) in a BBSI-compliant manner and 2) in a maximally concentrated manner. The electronic test system 120 can generate the predetermined list of securities in accordance with the securities in the portfolio (e.g., the security and the one or more previously selected securities). For example, the system can determine a list of securities that includes securities with the same standard industrial classification score ("SIC") code as the security previously chosen with the largest concentration, securities whose historical correlation is high with the security with the largest concentration, securities whose historical inverse correlation is high with the security with the largest concentration, or securities whose recent ADTV is high. In one example, the electronic test system 120 can rank order securities according to respective ADTVs of the securities, the respective correlation coefficients, or any combination of the two.

In one example, for a portfolio subject to the BBSI constraints from set A that already includes two securities at respective concentrations of 30% and 27%, forty-three additional securities at 1% concentration each can be selected to complete the portfolio (i.e., to comply with the total concentration of the top five concentrated securities being equal to or below 60% and the requirement that each concentration be a positive integer). The system can suggest a list of securities to populate the forty-three remaining positions in order of highest correlation to the stock allocated at 30% concentration.

After the test subject selects the securities for the plurality of concentrations, the electronic test system 120 can store one or more keyed data records structured with data specifying the selected securities and the plurality of concentrations in the hardware storage device 106.

The method described above for generating a maximally concentrated, BBSI-compliant security index can be implemented in generating a test in which multiple test subjects construct one or more respective test subject-specific BBSIs. The test can include a start time and an end time, where the test subjects construct the BBSIs prior to the start time, and a rank ordering of the test subject-specific BBSIs is determined at the end time. The BBSIs can be initially constructed using a predetermined monetary budget so that each BBSI is initially of equal value. The rank ordering of test subjects can be determined based on the respective monetary values at the end time. The test is described in further detail below with respect to FIG. 6.

Figure 2:
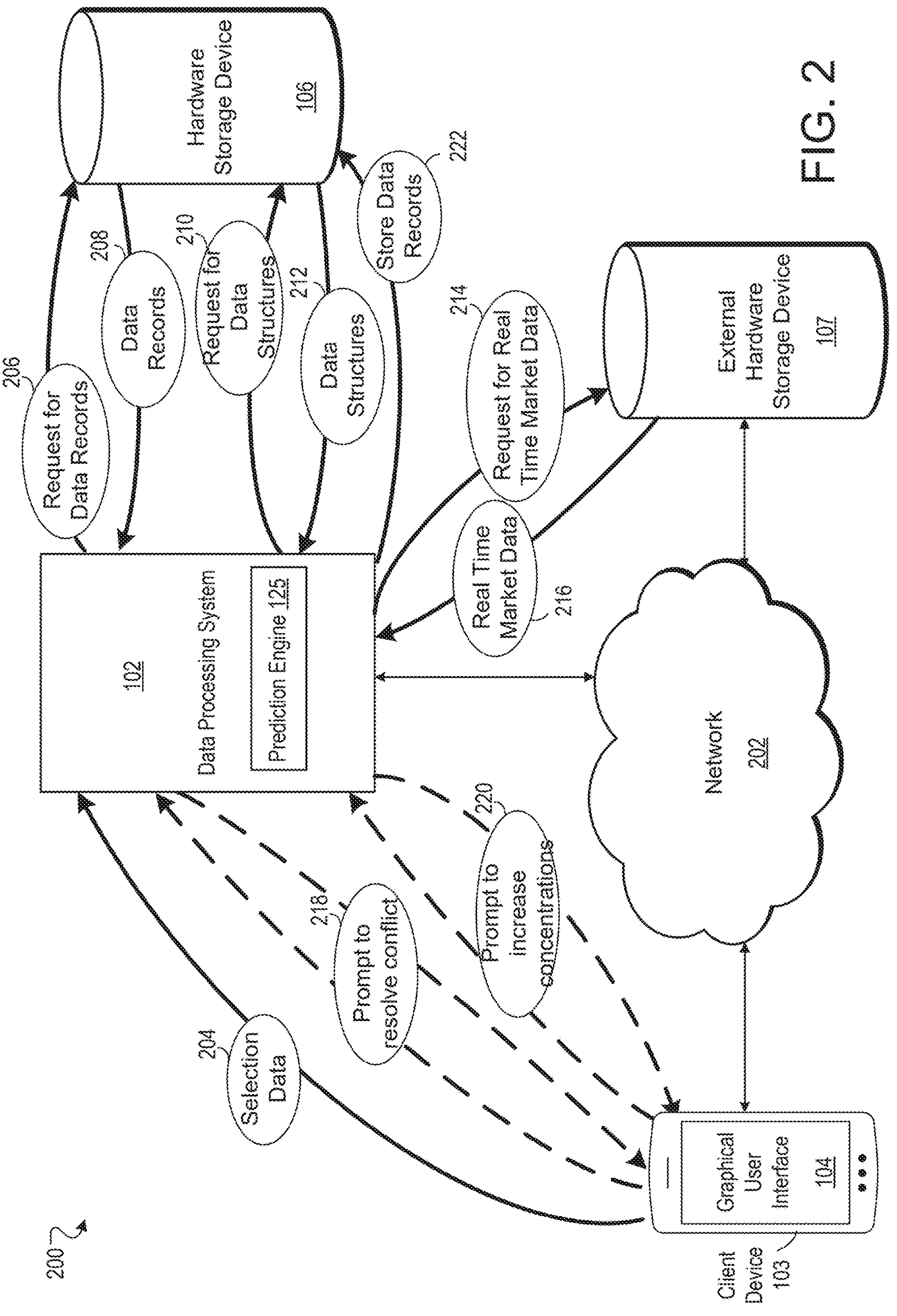
FIG. 2 depicts an example environment of a networked data processing system for constructing a maximally concentrated Broad-Based Security Index.

FIG. 2 shows an example environment 200 of a networked system for constructing a maximally concentrated Broad-Based Security Index. The networked data processing system is an example of a system implemented as computer programs on one or more computers in one or more locations in which the systems, components, and techniques described below are implemented. The environment 200 illustrates the requests for data and the data flow of the networked system, e.g., the system 100 of FIG. 1.

The environment 200 includes an electronic test system 120, a graphical user interface 126 rendered on a client device 104, a hardware storage device 106, an external hardware storage device 107, and a network 202.

The electronic test system 120 receives, through the graphical user interface 126, selection data 204 that is associated with a key that uniquely identifies a test subject. The selection data 204 can represent, e.g., a security and a concentration of the security, as described above with respect to FIG. 1. The graphical user interface 126 can be displayed on the client device 104, e.g., a computer, tablet, cell phone, or other mobile device. The client device can transmit the selection data 204 to the electronic test system 120 over the network 202, e.g., the internet, a local area network ("LAN"), or wide area network ("WAN").

The electronic test system 120 transmits a request 206 for data records associated with the key to the hardware storage device 106. The data records can represent, e.g., one or more previously selected securities and one or more respective concentrations of the previously selected securities, as described above with respect to FIG. 1. For example, the hardware storage device 106 can be located locally with the electronic test system 120, e.g., within the same computing device, so that the electronic test system 120 transmits the request over a bus system.

In another example, the data records can be located in one or more hardware storage devices that are located remotely, e.g., in a single hardware storage device located remotely, or distributed in cloud storage, so that the electronic test system 120 can transmit the request 206 for data records over the network 202.

The hardware storage device 106 receives the request 206 for data records associated with the key. In response to the request 206, the hardware storage device 106 transmits keyed data records 208 to the electronic test system 120, e.g., over a bus system or the network 202, as described above. The electronic test system 120 receives the data records 208.

The electronic test system 120 transmits a request 210 for data structures that specify one or more sets of broad-based security index ("BBSI") constraints, as described above with respect to FIG. 1. The electronic test system 120 can transmit the request 210 to the hardware storage device 106, e.g., over a bus system or the network 202.

The hardware storage device 106 receives the request 210 for data structures. In response to the request 210, the hardware storage device 106 transmits data structures 212 to the electronic test system 120, e.g., over a bus system or the network 202. The electronic test system 120 receives the data structures 212.

The electronic test system 120 transmits a request 214 for real time market data that includes at least, for each security in the market, a respective price history, a respective trade volume history, and a respective market capitalization, as described above with respect to FIG. 1. The electronic test system 120 can transmit the request 214 to the external hardware storage device 107, e.g., over the network 202.

The hardware storage device 107 receives the request 214 for the real time market data. In response to the request 214, the external hardware storage device 107 transmits the real time market data 216 to the electronic test system 120, e.g., the network 202. The electronic test system 120 receives the real time market data 216.

The electronic test system 120 processes the selection data 204, the data records 208, the data structures 212, and real time market data 216 to determine whether there is a conflict among the selection data 204 and the data records 208 according to the data structures 212 and real time market data 216. For example, electronic test system 120 can include a parser and a simulation engine to determine if there is a conflict, as described above with reference to FIG. 1.

When there is a conflict, the electronic test system 120 can prompt, through the graphical user interface 126, a test subject to resolve the conflict. The electronic test system 120 can transmit over the network 202 instructions to cause the graphical user interface 126 to display prompt 218 to resolve the conflict. The test subject can select a visual representation of one or more securities and one or more respective concentrations of the securities to resolve the conflict. The client device on which the graphical user interface 126 is displayed can transmit the selection of the visual representation over the network 202 to the electronic test system 120. An example of a conflict resolution prompt is shown in FIG. 3A and described below with respect to the description of FIG. 3A.

The electronic test system 120 can determine whether there is any remaining conflict. When there are one or more remaining conflicts, the electronic test system 120 can prompt the test subject through the graphical interface 126 to resolve the one or more remaining conflicts. The electronic test system 120 can repeatedly prompt the test subject through the graphical user interface 126 until the electronic test system 120 determines there is no remaining conflict.

When there is no determined conflict, the electronic test system 120 can determine whether the concentration of the security or at least one of the one or more concentrations of the previously selected securities can be increased without violating the BBSI constraints. If the electronic test system 120 determines that one or more of the concentrations can be increased, the electronic test system 120 can prompt, through the graphical user interface 126, the test subject to increase the concentrations. The data processing system 126 can transmit over the network 202 instructions to the graphical user interface 126 to render prompt 220 for the test subject to increase concentrations. In response to receiving a selection, by the test subject, to increase the concentrations, the electronic test system 120 can increase at least one of the concentrations, as is described above with reference to FIG. 1.

The electronic test system 120 stores one or more data records 222 in the hardware storage device 106. The electronic test system 120 can transmit the one or more data records 222 to the hardware storage device 106, e.g., over a bus system or the network 202. For example, the electronic test system 120 can store one or more keyed data records structured with data specifying a concentration of the security. When at least one of the one or more concentrations of the previously selected securities can be increased without violating the BBSI constraints in the data structures 212 and the electronic test system 120 received a selection to increase the concentrations, the electronic test system 120 can store one or more keyed data records with data specifying at least one of the one or more increased concentrations.

FIG. 3A-B depict graphical user interfaces 300 and 350 (e.g., rendered on a display of a client device) rendering prompts 302 and 352 that can be shown on a graphical user interface during the construction of a security index. The graphical user interface can be displayed on a client device, e.g., a computer, tablet, cell phone, or other mobile device, and through any appropriate application, e.g., a web browser, or dedicated mobile application.

FIG. 3A depicts a graphical user interface 300 (e.g., rendered on a display of a client device) rendering a prompt 302 for conflict resolution that can be shown on a graphical user interface.

The example illustrates examples of visual representations 310*a*, 320*a*, 330*a* that show securities and control input areas 310*b*, 320*b*, 330*b* displaying respective concentrations of the securities. The test subject can interact with the graphical user interface 300 to select one or more securities, e.g., one at a time, and adjust the respective concentrations. The concentrations can be selected, e.g., using respective sliding bars that allow adjustment from a respective minimum value for the security to a respective maximum value for the security. The respective minimum and maximum values for each security can be determined in accordance with the BBSI constraints.

The prompt 302 can indicate one or more conflicts, and prompt the test subject to resolve the one or more conflicts, e.g., allowing the test subject to resolve the conflicts one at a time. In the example of FIG. 3, the prompt includes an exclamation point to the right of the concentration sliding bar for security 310*a* ("Security ABC") to indicate that the concentration 310*b* ("35%") exceeds the maximum limit set by the BBSI constraints for any single security (30% for both BBSI constraint set A and BBSI constraint set B, described above with reference to FIG. 1).

FIG. 3B depicts a graphical user interface 350 (e.g., rendered on a display of a client device) rendering a prompt 352 for increasing concentrations that can be shown on a graphical user interface.

The example illustrates examples of visual representations 360*a*, 370*a*, 380*a* that show securities, e.g., the security and one or more previously selected securities of FIG. 1 selected by the test subject, and display areas 360*b*, 370*b*, 380*b* displaying respective prepopulated concentrations of the securities. The test subject can interact with the graphical user interface 350 to select control input area 354 indicating to allow the increased security concentrations or control input area 356 indicating to disallow the increased security concentrations. The respective concentration for each security can be from a BBSI-compliant, prepopulated template.

Figure 4A:
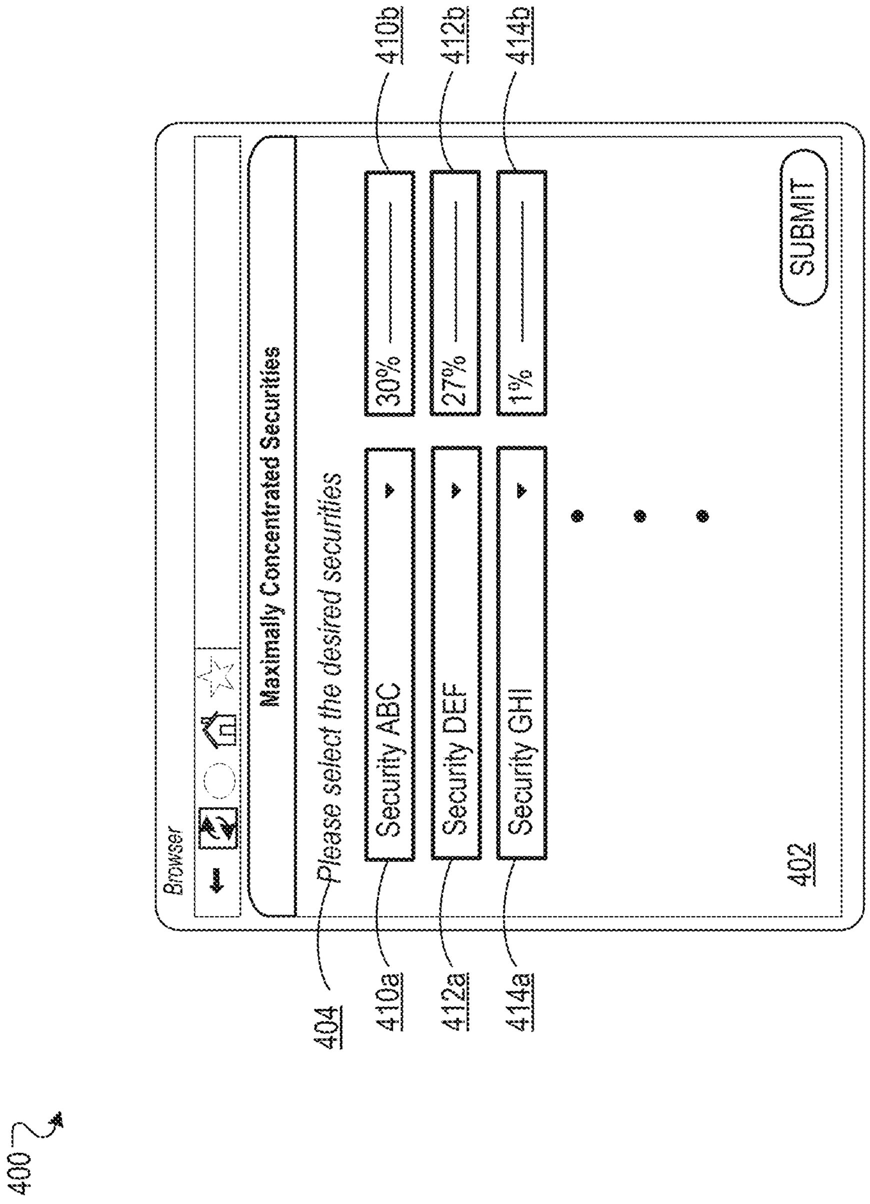
FIG. 4A-C depict examples of graphical user interfaces for selecting securities from prepopulated templates.
Figure 4B:
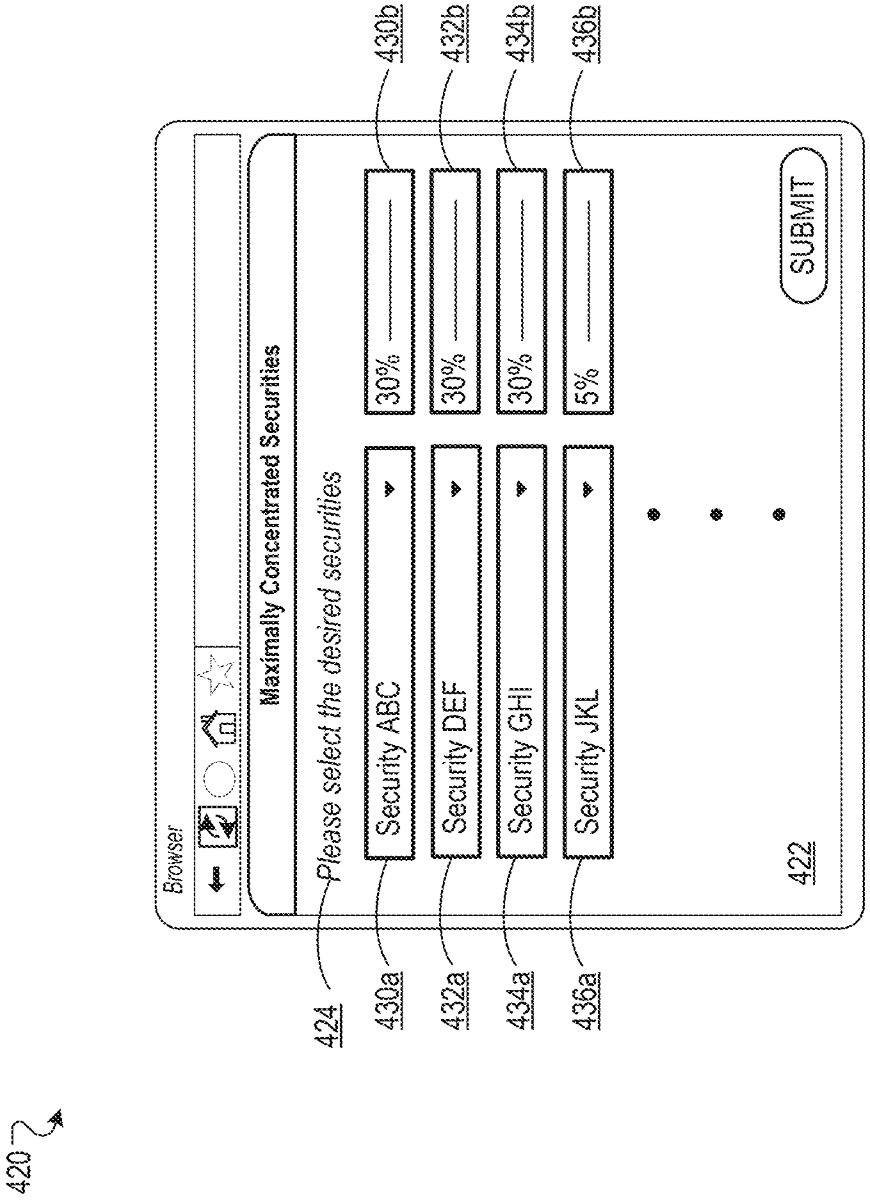
Figure 4C:
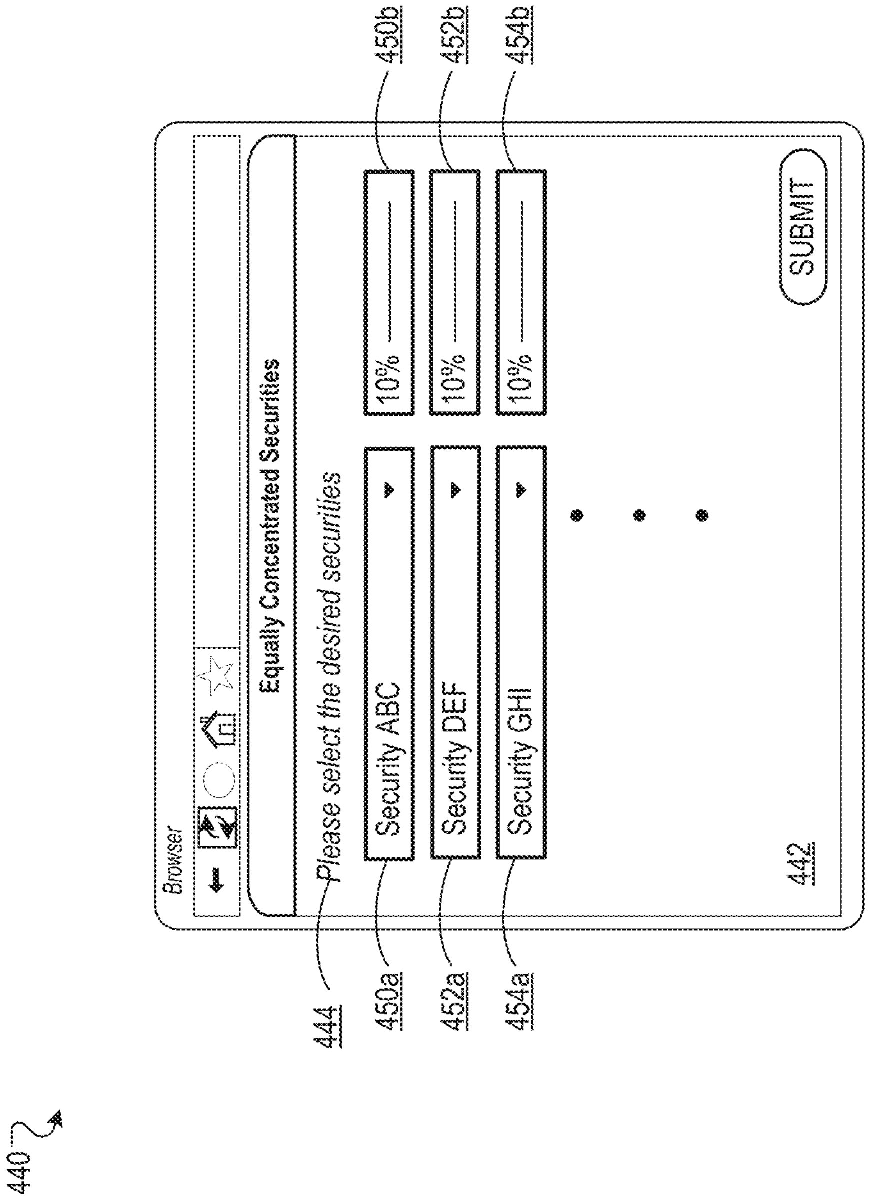

FIGS. 4A-C depict graphical user interfaces 400, 420, and 440 rendering prepopulated templates 402, 424, and 442 that have concentrations predetermined. The prepopulated templates can be displayed on the graphical user interfaces in response to the test subject selecting the prepopulated template. The test subject can interact with the graphical user interface to select a respective security from a set of securities that are BBSI-compliant for each pre-selected concentration.

FIG. 4A illustrates graphical user interface 400 with template 402. Generally, a template includes a prompt that includes instructions for the test subject and a set of predefined securities from which the test subject can select in constructing an index. In this example, the template is a maximally concentrated template, which includes multiple predetermined concentrations that include the highest BBSI-compliant concentrations for set A constraints.

The example illustrates visual representation of a prompt 404 that presents an instruction to "Please select the desired securities"; visual representations 410*a*, 412*a*, and 414*a* displaying securities; and display areas 410*b*, 412*b*, and 414*b* showing respective predetermined concentrations. The predetermined concentrations represent a maximally concentrated security index that satisfies the BBSI constraints of set A with a highest concentration of 30%, second highest of 27%, and all remaining concentrations at 1% (i.e., to satisfy that constraint that the top five weighted securities have concentrations that sum to 60% or less).

FIG. 4B illustrates graphical user interface 420 with template 422. In this example, the template is a maximally concentrated template, which includes multiple predetermined concentrations that include the highest BBSI-compliant concentrations for set B constraints.

The example illustrates example visual representation of a prompt 424 that presents an instruction to "Please select the desired securities"; visual representations 430*a*, 432*a*, 434*a*, and 436*a* displaying securities; and display areas 430*b*, 432*b*, 434*b*, and 436*b* showing respective predetermined concentrations. The predetermined concentrations represent a maximally concentrated security index that satisfies the BBSI constraints of set B with three equal highest concentrations of 30%, a next highest of 5%, and all remaining concentrations at 1% (i.e., to satisfy the constraints that the securities have respective concentrations less than or equal to 30%, and that there are at least nine component securities).

FIG. 4C illustrates graphical user interface 440 with template 442. In this example, the template is an equally concentrated template, which includes multiple predetermined concentrations that include, exactly or approximately, equal BBSI-compliant concentrations for the securities.

The example illustrates example visual representation of a prompt 444 that presents an instruction to "Please select the desired securities"; visual representations 450*a*, 452*a*, and 454*a* displaying securities; and display areas 450*b*, 452*b*, and 454*b* showing respective predetermined concentrations. The pre-selected concentrations represent an equally concentrated security index that satisfies BBSI constraints of set A and set B. The example illustrates ten securities with equal concentrations (i.e., 10% each). Other examples can include eleven or more securities that each have exactly or approximately equal concentrations.

Figure 5A:
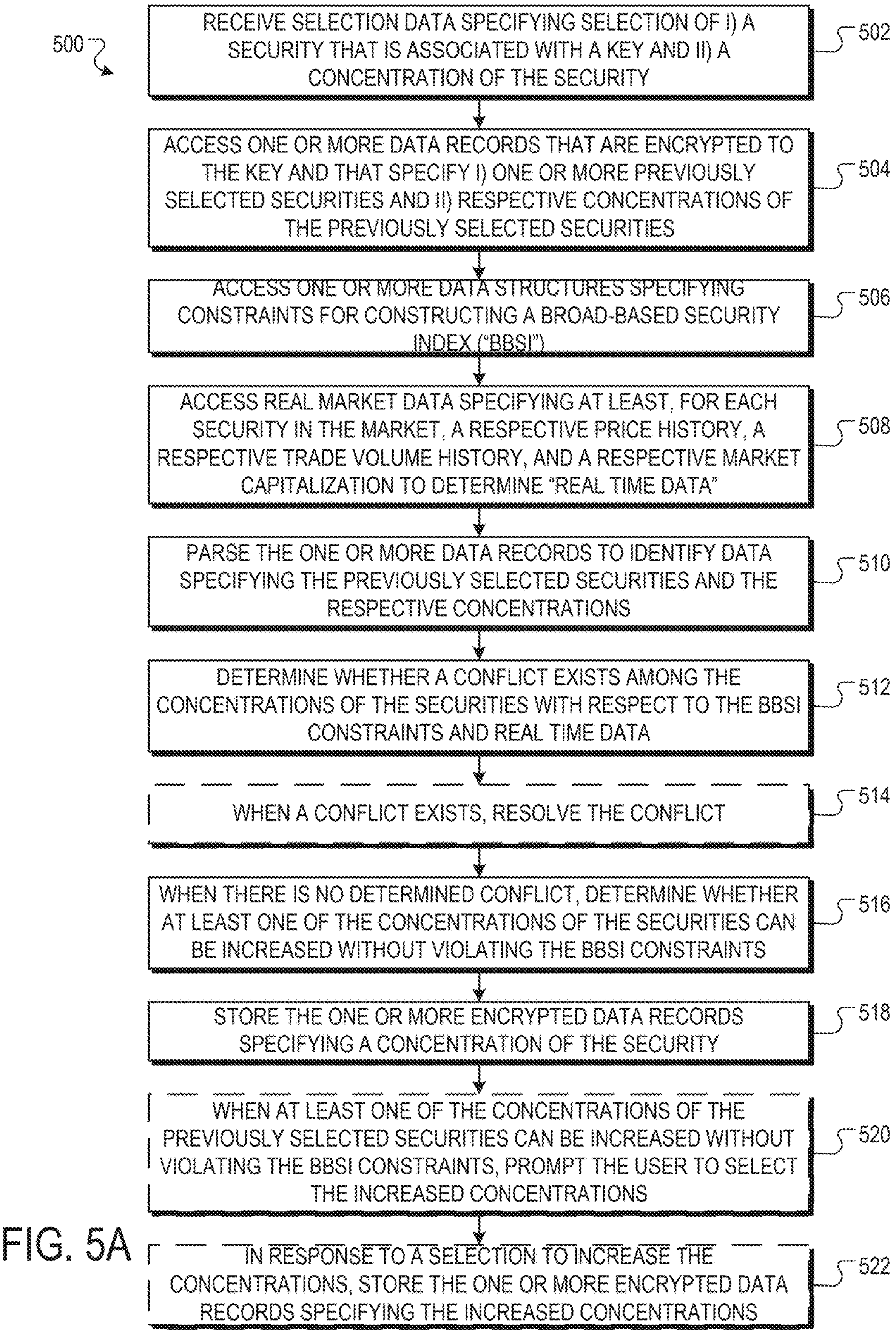
FIGS. 5A-5C depict examples of flow diagrams for example processes, according to implementations of the current disclosure.

FIG. 5A is a flow diagram of an example process 500 for processing digital data to construct maximally concentrated Broad-Based Security Indices. For convenience, the process 500 will be described as being performed by a system of one or more computers located in one or more locations. For example, a system, e.g., the system 100 of FIG. 1, appropriately programmed in accordance with this specification, can perform the process 500.

The system receives selection data specifying selection of i) a security that is associated with a key and ii) a concentration of the security (502). The system can receive the selection data through a graphical user interface, e.g., a graphical user interface on a client device.

The system accesses one or more data records that are encrypted using the key and that i) specify one or more previously selected securities and ii) respective concentrations of the previously selected securities (504). The system can access the one or more data records, e.g., from a hardware storage device.

The system accesses one or more data structures specifying constraints for constructing a BBSI (506). The system can access the one or more data structures, e.g., from the hardware storage device. For example, the one or more data structures can specify one or more sets of BBSI constraints, including a set A of constraints and a set B of constraints, as described with respect to FIG. 1.

The system accesses real time market data specifying at least, for each security in the market, a respective price history, a respective trade volume history, and a respective market capitalization. The system can process the real time market data to determine a respective ADTV and correlation coefficient with respect to the security for each security in the market ("real time data") (508). The system can access the real time market data, e.g., from an external hardware storage device. For example, the system can access the real time market data to determine the real time data as described with respect to FIG. 1.

The system parses the one or more data records to identify data specifying the previously selected securities and the respective concentrations (510). The system can parse the one or more data records based on the structure of the data records (including time series with simple and complex data patterns). For example, the system can parse the data records using a parser located within memory in the system. The parsing can include pattern-based parsing, using a prediction engine including training of machine learning models using affirmative actions (labeled patterns) with event characteristics as features. The training of machine learning models uses as input a training dataset with units of events and attributed affirmative actions (conversion or conversion values) and combinations, matching the structure of the eventified patterns of the real time market data. Parsing real time data relative to the eventified patterns can reduce processing complexity and automatically provides consistency across real time data series with similar patterns. For example, a training system can be used to train a machine learning model on denoised aggregates and event-level data to predict optimally parsed data for the eventified log, resulting in a trained model. The affirmative actions (conversions or conversion values) can be provided to the training system as input features, and the parsed-event characteristics contain values that can be provided to the training system as target outputs. The training system can select the type of machine learning model to be trained, e.g., select a predefined or default type of machine learning model, or analyze the input features and the target outputs to identify a type of machine learning model according to reports, event scenarios, and data patterns. For example, types of machine learning models can include a gradient boosted trees model, a generalized linear model, a support vector machine, a decision tree model, or a neural network model, e.g., a multilayer perceptron (MLP). The machine learning models can be trained using machine learning training algorithms such as minimizing an error, computing a gradient, or performing backpropagation. In some implementations, the training system can use the metadata corresponding to denoised aggregates and the event-level report data to preprocess the values of the interaction-event characteristics to provide to the training system. For example, by using metadata that identifies the type of events, the prediction engine can preprocess the time series so that the training system can more accurately parse the time series data. The event data provided by event report data can be processed for event denoising including identification of key data associated with events. Each event in the event-level report data is transformed using the affirmative actions reported by the event-level reports for that event by implementing a 25 denoising transformation. The denoising transformation corrects both for the randomized response noising implemented by the event-level reports and the truncation it imposes on attributed affirmative actions. The transformation is data-driven and takes as input a set of summary statistics that index key aspects of the underlying data generating process. The summary statistics are determined from improved event-based aggregates to obtain key data from data patterns associated with events.

The system determines whether a conflict exists among the concentration of the security with the respective concentrations of the previously selected securities and the BBSI constraints (512). The system can determine whether a conflict exists according to each of the one or more sets of BBSI constraints in the data structures. For example, the system can use a simulation engine located within memory in the system to determine whether there is a conflict for each of the one or more BBSI constraints, as described above with respect to FIG. 1. The conflict resolution can be determined, by using a prediction engine including training of machine learning models using affirmative actions (labeled conflict resolutions) with conflict characteristics as features corresponding to conflict type (e.g., associated to constraint types). The training of machine learning models uses as input a training dataset including multiple data types (e.g., associated to a particular constraint type of the entire set of analyzed constraints) and attributed affirmative actions (conflict resolution), matching the conflict types. Automatic conflict resolution identification, without a manual input, can reduce processing time and can automatically provide an implementation of security measures to comply with imposed constraints, including safety and security constraints. In some implementations, the training system can use the metadata corresponding to particular constraint types to preprocess the parsed data to provide to optimize identification of conflict resolution. For example, by using metadata that identifies the type of constraints, the prediction engine can preprocess the parsed data so that the training system can optimize conflict resolution. The conflict resolution can be implemented according to an identified optimized order of addressing conflicts, wherein addressing a first conflict can affect (resolve or trigger) a second conflict.

Optionally, when a conflict exists, the system can prompt a test subject for input to resolve the conflict (514). The system can prompt the test subject through the graphical user interface by transmitting instructions to the graphical user interface to display a visual representation of the prompt, e.g., the prompt of FIG. 3.

When there is no determined conflict, the system determines whether the concentration of the security or at least one of the concentrations of the previously selected securities can be increased without violating the BBSI constraints (516). The system can determine whether at least one of the concentrations of the security or previously selected securities can be increased, e.g., using a simulation engine located in memory. For example, the system can determine if concentrations in a BBSI-compliant prepopulated template are more concentrated than the concentrations of the security and the one or more previously selected securities.

The system stores the one or more keyed data records specifying a concentration of the security (518). For example, the system can store one or more keyed data records specifying the concentration specified by the selection data, or—if the system determines that the concentration of the security can be increased—the maximum concentration allowable by the BBSI constraints.

Optionally, when at least one of the concentrations of the security and the previously selected securities can be increased without violating the BBSI constraints, the system can prompt the test subject through the graphical user interface to select the increased concentrations (520). For example, the system can transmit instructions to the graphical user interface that cause the graphical user interface to display the prompt, and the test subject can interact with the graphical user interface to select a visual representation indicating to accept the increased concentrations or to deny the increased concentrations.

In response to a selection by the test subject to increase the concentrations, the system stores the one or more keyed data records specifying the increased concentrations (522). For example, the system can store the one or more keyed data records that update concentrations of previously selected securities.

The example process 500 provides an optimized process that achieves inbound information latency leveling through the use of prediction models. The example process 500 includes a dynamic update of the prediction models (by continuously training the prediction models) according to an expected variance of individual assets/securities based on time-series data on the pattern of movements of individual security/asset prices in response to periodic, repeating external factors in the form of market-relevant informational events. The event-based predictions can include, without limitation, predicting which assets are most sensitive to scheduled (or anticipated), upcoming data releases on interest rates, employment, sector-specific consumer price index, and company-specific earnings announcements. In some implementations, the example process 500 includes a verification of stored data (e.g., data related to trading volume) for verification of compliance with legal requirements. The example process 500 advantageously integrates analysis of data structures corresponding to different configurations and/or system customizations, facilitating flexible generation of pre-sorted lists or groups of security/asset candidates that the prediction model suggests are likely, based on past data, to have high variance during the test period. The flexible nature of the data configuration supports a wide variety of portfolios across a rich diversity of service providers.

Figure 5B:
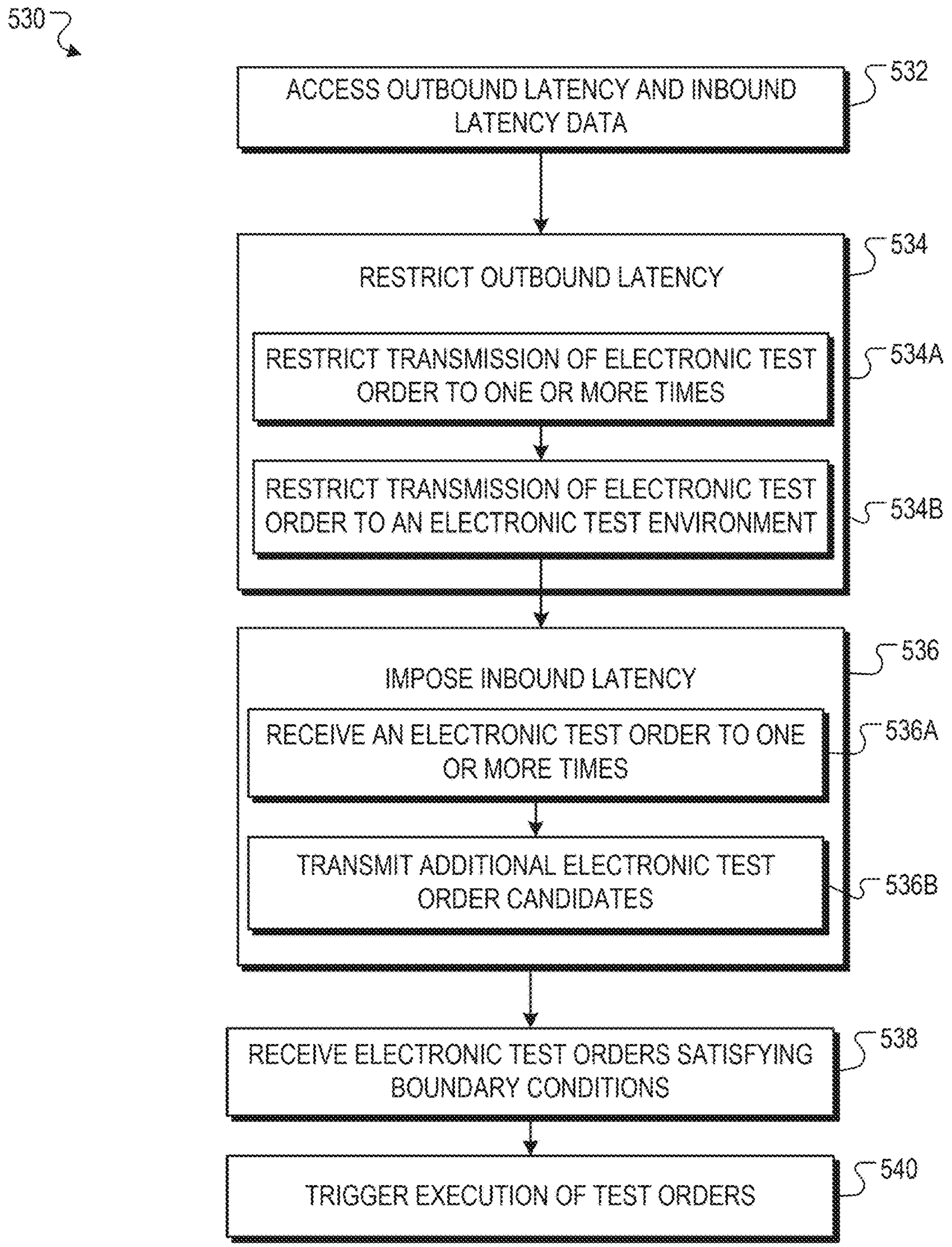

FIG. 5B depicts a flowchart of another example process 530, according to some implementations of the present disclosure. The example process 530 can be executed using, e.g., any component of the example system 100 described with reference to FIG. 1 or example system 200 described with reference to FIG. 2. Operations of the example process 530 are described below for illustration purposes only. Operations of the process 530 can be performed by any appropriate device or system, e.g., any appropriate data processing apparatus. Operations of the example process 530 can also be implemented as instructions stored on a computer readable medium which can be non-transitory. Execution of the instructions causes one or more data processing apparatus to perform operations of the example process 530. The example process 530 can be included in the example process 500 with reference to FIG. 5A or can be executed in response to a portion of the example process 540, described with reference to FIG. 5C.

At 532, outbound latency data and inbound latency data are accessed, during a testing event, by a data processing system and from a hardware device. The outbound latency data defines an outbound latency and inbound latency data defines an inbound latency. The outbound latency data and inbound latency data control a transmission of electronic test orders from multiple test subject devices independent of the computational powers of the test subject devices. The electronic test orders can be generated during the testing event (e.g., a latency test). The latency test can be generated, by the data processing system. The latency test can be applied to multiple test subjects and can construct respective test subject specific broad-based security indexes (BBSIs). Each test subject corresponds to one or more data structures ("test subject data structures") stored in a hardware storage device. The latency test includes a start time, an end time, and a predetermined value (e.g., monetary budget) for the test subject specific BBSIs. Prior to the test start time, a graphical user interface with a plurality of input controls for receiving input specifying one or more securities from a pre-specified selection universe for inclusion in the test subject specific BBSI, can be generated, by the data processing system. The graphical user interface can be accessible before the start time and being inaccessible after the test start time.

The test subject can be prompted, through the graphical user interface, to select a prepopulated template from one or more prepopulated templates. Each prepopulated template of the one or more prepopulated templates specifies a plurality of concentrations for completing a BBSI for the user and that satisfy the constraints for constructing a BBSI. The prepopulated templates can include one or more maximally concentrated templates or equally concentrated templates. In response to a selection of the prepopulated template: the computing system can automatically trigger an access, from the hardware storage device, of a plurality of data records that are structured to specify the plurality of concentrations and, for each of the plurality of concentrations, a respective security that is to be selected. A selection of data specifying selection of a visual representation of the selected respective securities can be received. The selection data can be associated with the key that uniquely identifies the test subject associated with the selection data and is used for data encryption. The test subject can be prompted, through the graphical user interface, to select, for each of the plurality of concentrations, a respective security for the concentration from a set of securities that satisfy the BBSI constraints. In some implementations, a respective security for the concentration from a set of securities that satisfy the BBSI constraints is selected, by a prediction model, for each of the plurality of concentrations. For example, the parser of the data processing system includes a trained prediction model trained to identify, based on the structure, data specifying the selected respective securities and data specifying the plurality of concentrations. The data records are parsed, by the parser of the data processing system to identify, based on the structure, data specifying the selected respective securities and data specifying the plurality of concentrations. The securely encrypted (keyed) data records structured with data specifying the plurality of selected securities and the plurality of concentrations are stored, in the hardware storage device.

For a particular test subject data structure, in response to receiving input from the input controls, the test subject data structure is updated with data specifying names of selected securities and concentrations of selected securities. It is determined whether a conflict exists among concentrations of securities in the test subject data structure and the BBSI constraints. The BBSI constraints specify: the BBSI has nine or more component securities, no single component security includes more than 30 percent of the index's weighting, all of the component securities are registered under section 12 of the Exchange Act, and each component security is both one of the 750 securities with the largest market capitalization and one of the 675 component securities with the largest value of the average daily trading volume ("ADTV"). If a conflict exists, an input is requested and used upon receipt to resolve the conflict. At the test end time, a rank ordering of the test subject data structures is determined in accordance with respective monetary values of the test subject data structures. The graphical user interface can be caused to be rendered, on a client device, with one or more visual representations of results of test subjects. In some implementations, for determining whether a conflict exists, real time market data specifying at least, for each security in a security market, a respective price history, a respective trade volume history, and a respective market capitalization is accessed, from an external hardware storage device. The market data is processed in real time to determine, for each security in the security market, a respective average daily trading volume ("ADTV") for the security and a respective correlation coefficient for the security with respect to at least one of the securities and the one or more previously selected securities ("real time data"). Based on the parsed data and the real time data, it is determined, by the data processing system, whether a conflict exists among the concentration of the security with respective concentrations of the previously selected securities and the BBSI constraints.

At 534, the outbound latency defined by the outbound latency data is restricted, by the data processing system, to control execution of electronic test orders. The outbound latency data restriction includes, for each of the test subject devices, at 534A, restriction of transmission of an electronic test order to one or more times and, at 534B, restriction of transmission of the electronic test order to an electronic test environment.

At 536, the inbound latency defined by the inbound latency data is imposed, by the data processing system, to control submission of electronic test orders. Imposing the inbound latency data restriction includes, for each of the test subject devices, at 536A, receiving, by the data processing system, an electronic test order comprising a weighted value. Imposing the inbound latency data restriction includes, for each of the test subject devices, at 536B, an indication of one or more additional electronic test orders is transmitted, in real-time, by the data processing system and to a test subject device of the plurality of test subject devices. The additional electronic test orders are candidates for selection that satisfy one or more boundary conditions of the electronic test environment. A boundary condition specifies a maximum weighted value of another electronic test order based on the weighted value of the electronic test order. The indication, for each additional electronic test order, specifies a maximum weighted value assignable to that additional electronic test order based on the weighted value of the electronic test order and further specifies a cross correlation metric for that additional electronic test order. The one or more boundary conditions include constraints specifying: no single component security includes more than 30 percent of the index's weighting, five highest weighted component securities together include no more than 60 percent of the index's weighting, and the lowest weighted component securities including, in an aggregate, 25 percent of the index's weighting have an aggregate value of average daily trading volume (ADTV) of a threshold value.

At 538, electronic test orders satisfying the one or more boundary conditions are received in accordance with imposing the outbound and inbound latencies, from each test subject device.

At 540, an execution of the electronic test orders is triggered by an electronic test environment.

Figure 5C:
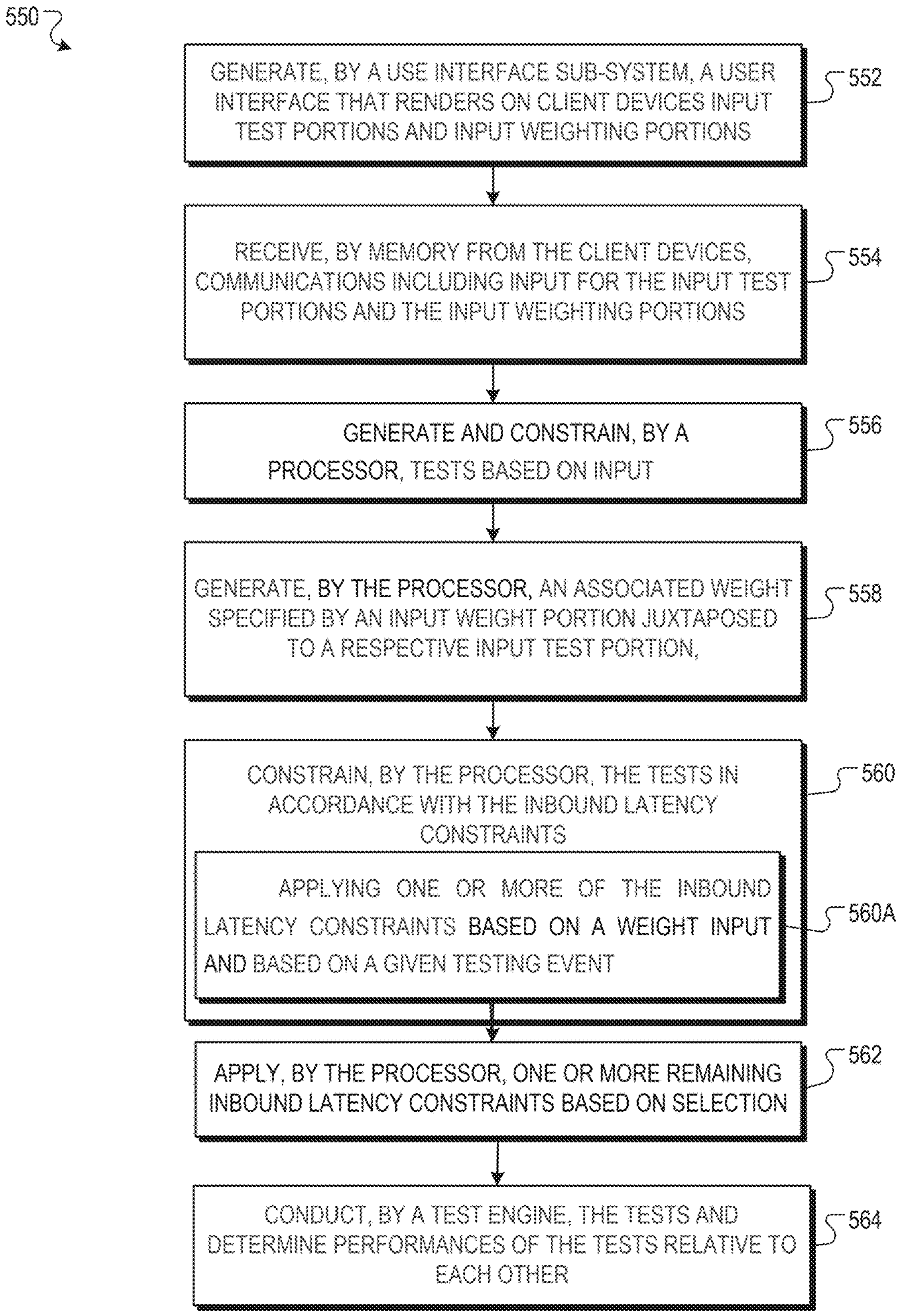

FIG. 5C depicts a flowchart of another example process 550, according to some implementations of the present disclosure. The example process 550 can be executed using. e.g., any component of the example system 100 described with reference to FIG. 1 or example system 200 described with reference to FIG. 2. Operations of the example process 550 are described below for illustration purposes only. Operations of the process 550 can be performed by any appropriate device or system, e.g., any appropriate data processing apparatus. Operations of the example process 550 can also be implemented as instructions stored on a computer readable medium which can be non-transitory. Execution of the instructions causes one or more data processing apparatus to perform operations of the example process 550. The example process 550 can be included in the example process 500, 530 with reference to FIG. 5A or SB.

At 552, a user interface sub-system generates a user interface that renders on client devices a plurality of input test portions and input weighting portions, with an input test portion juxtaposed to an input weighting portion in the user interface, with an input test portion being for receiving input representing a testing event, and with an input weighting portion being for receiving input specifying a weight of a testing event represented by input into a input test portion juxtaposed to the input weighting portion.

At 554, a memory receives, from the client devices, communications comprising input for the input test portions and the input weighting portions, wherein the input received from a respective client device defines an order of testing events.

At 556, a processor of a server system (e.g., server system 102 of FIG. 1) generates and constrains tests based on input specified for the input test portions and input weighting portions comprised in graphical user interfaces rendered on the client devices, with a test, for a given client device, comprising testing events specified by input test portions rendered on a graphical user interface displayed on the given client device.

At 558, for each testing event, a processor generate an associated weight specified by an input weight portion juxtaposed to a respective input test portion, with each of the tests being equally constrained in accordance with the one or more boundary conditions specifying a criteria for the testing events to satisfy to be comprised in the test, the time constraint, the inbound latency constraints and the outbound latency constraint to control a transmission of electronic test orders from the client devices independent of computational powers of the client devices.

At 560, the processor constrains the tests in accordance with the inbound latency constraints by, for each client device: as an item of input is received, applying (at 560A) one or more of the inbound latency constraints by: based on a weight input into a input weighting portion for a first testing event specified by an input testing portion, generate a notification of a maximum weight assignable to a second testing event that comes sequentially after the first testing event in the order, with the maximum weight being in accordance with the one or more boundary conditions, and based on a given testing event specified to be first in the order, cause rendering on a display of the client device in near real time relative to when input specifying the given testing event is received and ranked in descending order, visual representations of other testing events that are candidates for inclusion in the test, wherein juxtaposed to each visual representation is an indicator specifying a direction of a relationship between the given testing event and the testing event represented by that visual representation.

At 562, in response to receiving an indication of completion of selection of the testing events, the processor applies one or more remaining inbound latency constraints to the lowest weighted testing event.

At 564, a testing engine configured, upon determining that each of the tests complies with the one or more boundary conditions, the time constraint, the inbound latency constraints and the outbound latency constraint, to conduct the tests and determine performances of the tests relative to each other.

Figure 6:
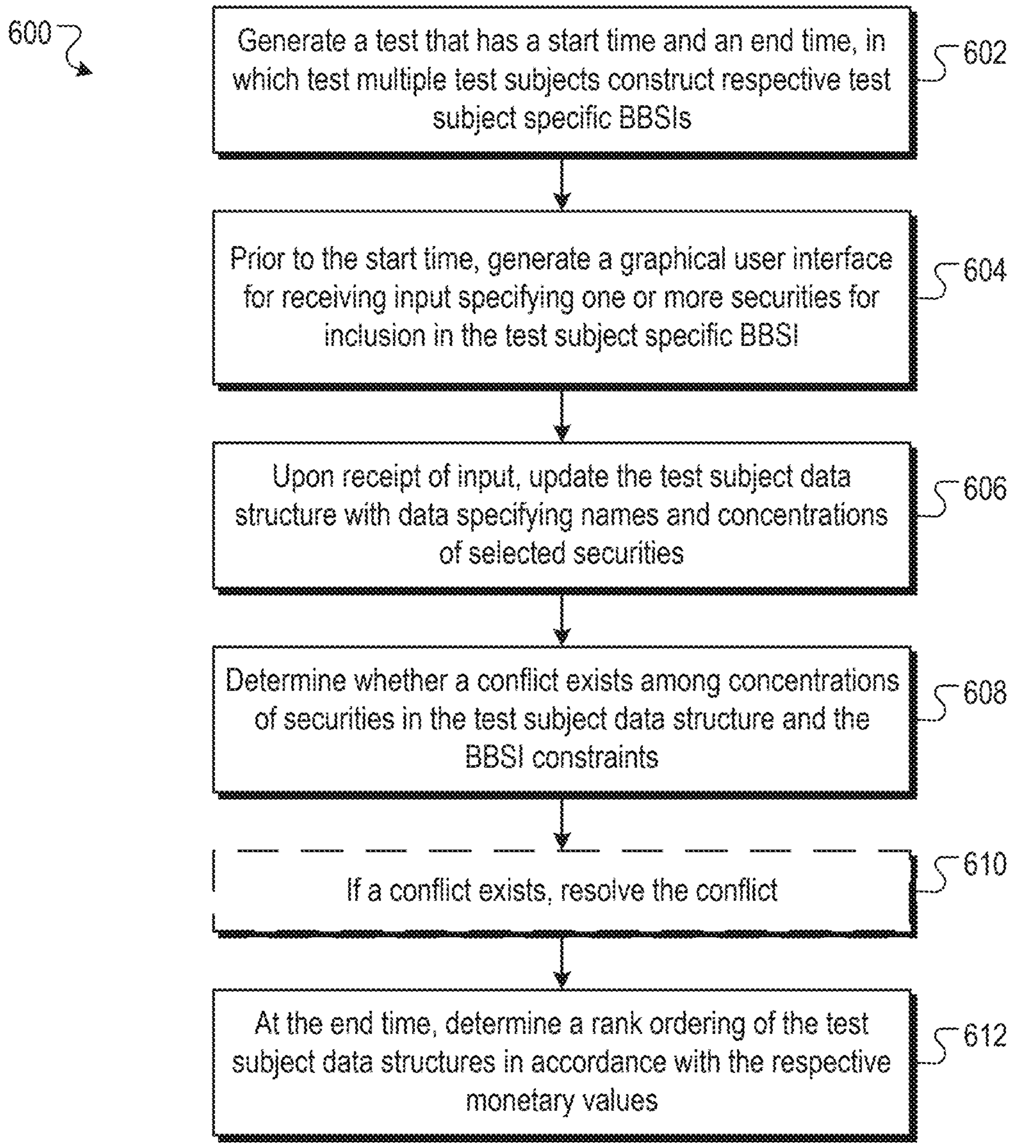
FIG. 6 depicts a flow diagram for an example process for conducting a test.

FIG. 6 is a flow diagram of an example process 600 for conducting a test. For convenience, the process 600 will be described as being performed by a system of one or more computers located in one or more locations.

Generally, the test can include a start time and an end time, where test subjects in the test construct the BBSIs prior to the start time. The test can include a predetermined number of test subjects, a preannounced entry fee, and a preannounced prize table, e.g., where each entry in the prize table includes a respective predetermined prize. At the end time, the system can determine a numerical rank ordering of the test subject BBSIs in accordance with a respective monetary value of each test subject BBSI at the end time. The numerical rank order can be matched to the preannounced prize table, e.g., where each entry in the prize table corresponds to a numerical rank in the numerical rank ordering of the test subject BBSIs.

The system generates a test that has a start time and an end time, in which test multiple test subjects construct one or more respective test subject specific BBSIs (602). The system can generate one or more respective "test subject data structures" for each test subject to store in a hardware storage device. The test subject BBSIs can be initially constructed using a predetermined monetary budget so that each test subject BBSI is initially of equal value. For example, the test subject data structures can include data structured to specify the test subject, the test, one or more securities, one or more respective concentrations of the securities, and one or more respective long or short flags for the securities.

Prior to the start time, the system generates a graphical user interface for receiving input specifying one or more securities for inclusion in the test subject specific BBSI (604). The graphical user interface is accessible before the start time and inaccessible after the start time. The one or more securities can be from a pre-specified index. For example, the system can include a data processing system that is configured to generate the graphical user interface, and the data processing system can transmit instructions to the graphical user interface that cause the graphical user interface to display a visual representation for a test subject to select the input, as described with respect to FIG. 1.

Upon receipt of the input, the system updates the test subject data structure with data specifying names, e.g., represented by a ticker symbol, long or short flags, and concentrations of the selected securities (606). For example, the system can parse the input to identify the names, long or short flags, and concentrations of the securities using a parser and store the data in the hardware storage device to update the test subject data structure, as described above with respect to FIG. 1.

The system determines whether a conflict exists among concentrations of securities in the test subject data structure of the BBSI constraints (608). The system can process the concentrations using a simulation engine to determine whether a conflict exists, as described with respect to FIG. 1. The conflict resolution can be determined, by using a prediction engine including training of machine learning models using affirmative actions (labeled conflict resolutions) with conflict characteristics as features corresponding to conflict type (e.g., associated to constraint types). The training of machine learning models uses as input a training dataset including multiple data types (e.g., associated to a particular constraint type of the entire set of analyzed constraints) and attributed affirmative actions (conflict resolution), matching the conflict types. Automatic conflict resolution identification, without a manual input, can reduce processing time and can automatically provide an implementation of security measures to comply with imposed constraints, including safety and security constraints. In some implementations, the training system can use the metadata corresponding to particular constraint types to preprocess the parsed data to provide optimized identification of conflict resolution. The conflict resolution can be implemented according to an identified optimized order of addressing conflicts, wherein addressing a first conflict can affect (resolve or trigger) a second conflict.

Optionally, if a conflict exists, the system receives input to resolve the conflict (610). If a conflict exists, the system can receive input through a graphical user interface to resolve the conflict. For example, the system can transmit instructions to the graphical user interface that cause the graphical user interface to display, to a test subject, a prompt to resolve the conflict, as described with respect to FIG. 1.

At the end time, the system determines rank ordering of the test subject data structures in accordance with the respective monetary values (612). The numerical rank order can be matched to a preannounced prize table, e.g., where each entry in the table includes a predetermined prize. For each test subject data structure, the system can determine the monetary value, e.g., dollar value, of the test subject data structure as the difference between the monetary value of the securities at the end time and the monetary value of the securities at the start time.

For example, the system can determine the monetary value of each security at the start time by multiplying the concentration of the security by the predetermined monetary budget. The system can determine a quantity of each security by dividing the monetary value of the security by the price of the security at the start time. The system can determine the monetary value of each security at the end time by multiplying the quantity of the security by the price of the security at the end time. For each security, the system can determine the difference between the monetary value of the security at the end time and the monetary value of the security at the start time. If the security has a long flag, the system can determine the difference as the monetary value at the end time minus the monetary value at the start time. If the security has a short flag, the system can determine the difference as the monetary value at the start time minus the monetary value at the end time. The system can sum the differences to determine the monetary value of the test subject data structure.

The example process 600 provides an optimized process that leverages the advantage of maximizing the prediction model potential of resolving conflicts while preserving data privacy and the system security. The example process 600 can include automatic credit setup (without manual intervention) once the rank ordering is determined. For example, the example process 600 can include automatically set up credit amounts awarded to entities (e.g., test subjects) based on the respective performance to their respective accounts (the same way the accounts are automatically debited by the amount of the entry fee once a test subject submits a test portfolio). The debit and credit steps can be mediated by external computing systems, to which data is automatically transmitted without manual intervention. The example process 600 provides an interactive form associated with inbound information latency leveling that can include requesting, via the API associated with a test subject device or a computing system, information to perform the analysis, wherein the dynamically generated interactive form includes BBSI-compliant prepopulated templates that minimizes a risk of conflicts. The example process 600 leads to improved performance in data distribution by providing information latency leveling. Without the described latency leveling, the system of an average test subject would be at a serious disadvantage to a trader controlling a computing system including high data processing capabilities, limiting the access of the average test subject to an accurate assessment of the test subject's relative portfolio building ability.

Figure 7:
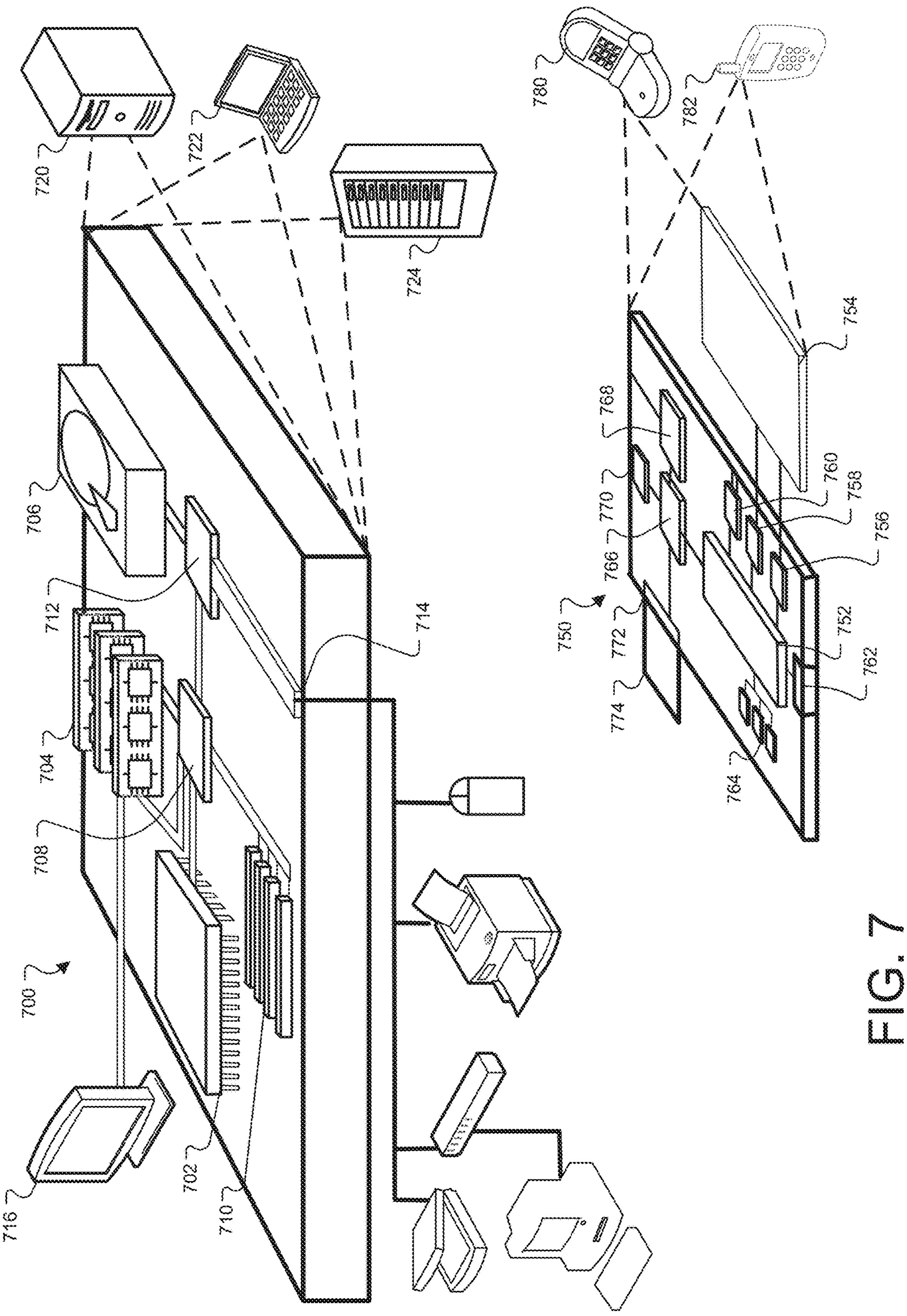
FIG. 7 depicts an example diagram of computing devices that can be used to implement a system for processing digital data to construct a maximally concentrated security index.

FIG. 7 is a diagram of computing devices 700 and 750 that can be used to implement a system for processing digital data to construct a maximally concentrated Broad-Based Security Index. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. Additionally, computing device 700 or 750 can include Universal Serial Bus (USB) flash drives. The USB flash drives can store operating systems and other applications. The USB flash drives can include input/output components, such as a wireless transmitter or USB connector that can be inserted into a USB port of another computing device. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and can be mounted on a common motherboard or in other manners as appropriate. The processor 702 can process instructions for execution within the computing device 700, including instructions stored in the memory 704 or on the storage device 708 to display graphical information for a graphical user interface ("GUI") on an external input/output device, such as display 716 coupled to high speed interface 708. In other implementations, multiple processors and/or multiple buses can be used, as appropriate, along with multiple memories and types of memory. Also, multiple computing devices 700 can be connected, with each device providing portions of the necessary operations, for example, as a server bank, a group of blade servers, or a multiprocessor system.

The memory 704 stores information within the computing device 700. In one implementation, the memory 704 is a volatile memory unit or units. In another implementation, the memory 704 is a non-volatile memory unit or units. The memory 704 can also be another form of computer-readable medium, such as a magnetic or optical disk.

The storage device 708 is capable of providing mass storage for the computing device 700. In one implementation, the storage device 708 can be or contain a computer-readable medium, such as a floppy disk device, a hard disk device, an optical disk device, or a tape device, a flash memory or other similar solid-state memory device, or an array of devices, including devices in a storage area network or other configurations. A computer program product can be tangibly embodied in an information carrier. The computer program product can also contain instructions that, when executed, perform one or more methods, such as those described above. The information carrier is a computer- or machine-readable medium, such as the memory 704, the storage device 708, or memory on processor 702.

The high-speed controller 708 manages bandwidth-intensive operations for the computing device 700, while the low speed controller 712 manages lower bandwidth intensive operations. Such allocation of functions is exemplary only. In one implementation, the high-speed controller 708 is coupled to memory 704, display 716, for example, through a graphics processor or accelerator, and to high-speed expansion ports 710, which can accept various expansion cards (not shown). In the implementation, low-speed controller 712 is coupled to storage device 708 and low-speed expansion port 714. The low-speed expansion port, which can include various communication ports, for example, USB, Bluetooth, Ethernet, wireless Ethernet can be coupled to one or more input/output devices, such as a keyboard, a pointing device, microphone/speaker pair, a scanner, or a networking device such as a switch or router, for example, through a network adapter. The computing device 700 can be implemented in a number of different forms, as shown in FIG. 7. For example, it can be implemented as a standard server 720, or multiple times in a group of such servers. It can also be implemented as part of a rack server system 724. In addition, it can be implemented in a personal computer such as a laptop computer 722. Alternatively, components from computing device 700 can be combined with other components in a mobile device (not shown), such as device 750. Each of such devices can contain one or more of computing device 700, 750, and an entire system can be made up of multiple computing devices 700, 750 communicating with each other.

The computing device 700 can be implemented in a number of different forms, as shown in FIG. 7. For example, it can be implemented as a standard server 720, or multiple times in a group of such servers. It can also be implemented as part of a rack server system 724. In addition, it can be implemented in a personal computer such as a laptop computer 722. Alternatively, components from computing device 700 can be combined with other components in a mobile device (not shown), such as device 750. Each of such devices can contain one or more of computing device 700, 750, and an entire system can be made up of multiple computing devices 700, 750 communicating with each other.

Computing device 750 includes a processor 752, memory 764, and an input/output device such as a display 754, a communication interface 766, and a transceiver 768, among other components. The device 750 can also be provided with a storage device, such as a micro-drive or other device, to provide additional storage. Each of the components 750, 752, 764, 754, 766, and 768, are interconnected using various buses, and several of the components can be mounted on a common motherboard or in other manners as appropriate.

The processor 752 can execute instructions within the computing device 750, including instructions stored in the memory 764. The processor can be implemented as a chipset of chips that include separate and multiple analog and digital processors. Additionally, the processor can be implemented using any of a number of architectures. For example, the processor 710 can be a CISC (Complex Instruction Set Computers) processor, a RISC (Reduced Instruction Set Computer) processor, or a MISC (Minimal Instruction Set Computer) processor. The processor can provide, for example, for coordination of the other components of the device 750, such as control of user interfaces, applications run by device 750, and wireless communication by device 750.

Processor 752 can communicate with a test subject through control interface 758 and display interface 756 coupled to a display 754. The display 754 can be, for example, a TFT (Thin-Film-Transistor Liquid Crystal Display) display or an OLED (Organic Light Emitting Diode) display, or other appropriate display technology. The display interface 756 can comprise appropriate circuitry for driving the display 754 to present graphical and other information to a test subject. The control interface 758 can receive commands from a test subject and convert them for submission to the processor 752. In addition, an external interface 762 can be provide in communication with processor 752, so as to enable near area communication of device 750 with other devices. External interface 762 can provide, for example, for wired communication in some implementations, or for wireless communication in other implementations, and multiple interfaces can also be used.

The memory 764 stores information within the computing device 750. The memory 764 can be implemented as one or more of a computer-readable medium or media, a volatile memory unit or units, or a non-volatile memory unit or units. Expansion memory 774 can also be provided and connected to device 750 through expansion interface 772, which can include, for example, a SIMM (Single In Line Memory Module) card interface. Such expansion memory 774 can provide extra storage space for device 750, or can also store applications or other information for device 750. Specifically, expansion memory 774 can include instructions to carry out or supplement the processes described above, and can include secure information also. Thus, for example, expansion memory 774 can be provide as a security module for device 750, and can be programmed with instructions that permit secure use of device 750. In addition, secure applications can be provided via the SIMM cards, along with additional information, such as placing identifying information on the SIMM card in a non-hackable manner.

The memory can include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752 that can be received, for example, over transceiver 768 or external interface 762.

Device 750 can communicate wirelessly through communication interface 766, which can include digital signal processing circuitry where necessary. Communication interface 766 can provide for communications under various modes or protocols, such as GSM voice calls, SMS, EMS, or MMS messaging, CDMA, TDMA, PDC, WCDMA, CDMA2000, or GPRS, among others. Such communication can occur, for example, through radio-frequency transceiver 768. In addition, short-range communication can occur, such as using a Bluetooth, Wi-Fi, or other such transceiver (not shown). In addition, GPS (Global Positioning System) receiver module 770 can provide additional navigation- and location-related wireless data to device 750, which can be used as appropriate by applications running on device 750.

Device 750 can also communicate audibly using audio codec 760, which can receive spoken information from a test subject and convert it to usable digital information. Audio codec 760 can likewise generate audible sound for a test subject, such as through a speaker, for example, in a handset of device 750. Such sound can include sound from voice telephone calls, can include recorded sound, for example, voice messages, music files, etc. and can also include sound generated by applications operating on device 750.

The computing device 750 can be implemented in a number of different forms, as shown in FIG. 7. For example, it can be implemented as a cellular telephone 780. It can also be implemented as part of a smartphone 782, personal digital assistant, or other similar mobile device.

Embodiments of the subject matter and the functional operations described in this specification can be implemented in digital electronic circuitry, tangibly-embodied computer software or firmware, computer hardware (including the structures disclosed in this specification and their structural equivalents), or in combinations of one or more of them. Embodiments of the subject matter described in this specification can be implemented as one or more computer programs (i.e., one or more modules of computer program instructions encoded on a tangible non-transitory program carrier for execution by, or to control the operation of, data processing apparatus). The computer storage medium can be a machine-readable storage device, a machine-readable storage substrate, a random or serial access memory device, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document, in a single file dedicated to the program in question, or in multiple coordinated files (e.g., files that store one or more modules, sub-programs, or portions of code)). A computer program can be deployed so that the program is executed on one computer or on multiple computers that are located at one site or distributed across multiple sites and interconnected by a data communication network.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks), however, a computer need not have such devices.

Computer-readable media suitable for storing computer program instructions and data include all forms of non-volatile memory on media and memory devices, including by way of example semiconductor memory devices (e.g., EPROM, EEPROM, and flash memory devices), magnetic disks (e.g., internal hard disks or removable disks), magneto-optical disks, and CD-ROM and DVD-ROM disks. The processor and the memory can be supplemented by, or incorporated in, special purpose logic circuitry.

The preceding figures and accompanying description illustrate example processes and computer implementable techniques. The environments and systems described above (or their software or other components) may contemplate using, implementing, or executing any suitable technique for performing these and other tasks. It will be understood that these processes are for illustration purposes only and that the described or similar techniques may be performed at any appropriate time, including concurrently, individually, in parallel, and/or in combination. In addition, many of the operations in these processes may take place simultaneously, concurrently, in parallel, and/or in different orders than as shown. Moreover, processes may have additional operations, fewer operations, and/or different operations, so long as the methods remain appropriate.

In other words, although the disclosure has been described in terms of particular implementations and generally associated methods, alterations and permutations of these implementations, and methods will be apparent to those skilled in the art. Accordingly, the above description of example implementations does not define or constrain the disclosure. Other changes, substitutions, and alterations are also possible without departing from the spirit and scope of the disclosure.

A number of implementations of the present disclosure have been described.

Nevertheless, it will be understood that various modifications may be made without departing from the spirit and scope of the present disclosure. Accordingly, other implementations are within the scope of the following claims.

In view of the above-described implementations of subject matter the application discloses the following list of examples, wherein one feature of an example in isolation or more than one feature of said example taken in combination and, optionally, in combination with one or more features of one or more further examples are further examples also falling within the disclosure of the application. In some implementations, any of the following examples may be performed concurrently, individually, in parallel, and/or in combination with any other of the listed examples.

Example 1. A computer-implemented method for inbound and outbound latency leveling in an electronic test environment, the computer-implemented method comprising: accessing, by a data processing system and from a hardware device, outbound latency data and inbound latency data defining an outbound latency and an inbound latency to control a transmission of electronic test orders from a plurality of test subject devices independent of the computational powers of the plurality of test subject devices; restricting, by the data processing system, the outbound latency defined by the outbound latency data to execution of electronic test orders by, for each of a plurality of test subject devices, restricting transmission of an electronic test order to one or more times; and restricting transmission of the electronic test order to an electronic test environment; imposing, by the data processing system, the inbound latency defined by the inbound latency data to submission of electronic test orders by, for each of the test subject devices, receiving, by the data processing system, an electronic test order comprising a weighted value; transmitting, in real-time, by the data processing system and to a test subject device of the plurality of test subject devices, an indication of one or more additional electronic test orders that are candidates for selection that satisfy one or more boundary conditions of the electronic test environment, with a boundary condition specifying a maximum weighted value of another electronic test order based on the weighted value of the electronic test order, with the indication, for each additional electronic test order, specifying a maximum weighted value assignable to that additional electronic test order based on the weighted value of the electronic test order and further specifying a cross correlation metric for that additional electronic test order; in accordance with imposing the outbound and inbound latencies, receiving, from each test subject device, a plurality of electronic test orders satisfying the one or more boundary conditions; and triggering an execution of the electronic test orders by an electronic test environment.

Example 2. The computer-implemented method of the preceding example, wherein the one or more boundary conditions comprise constraints specifying: no single component security comprises more than 30 percent of the index's weighting; five highest weighted component securities together comprise no more than 60 percent of the index's weighting; and the lowest weighted component securities comprising, in an aggregate, 25 percent of the index's weighting have an aggregate value of average daily trading volume (ADTV) of a threshold value.

Example 3. The computer-implemented method of any of the preceding examples, further comprising: generating, by the data processing system, a test in which a plurality of test subjects construct respective test subject-specific broad-based security indexes (BBSIs), with each test subject corresponding to one or more data structures ("test subject data structures") stored in a hardware storage device, wherein the test has a start time, an end time, and a predetermined monetary budget for the test subject-specific BBSIs, wherein the computer-implemented method comprises: prior to the start time, generating, by the data processing system, a graphical user interface with a plurality of input controls for receiving input specifying one or more securities from a pre-specified selection universe for inclusion in the test subject specific BBSI, with the graphical user interface being accessible before the start time and being inaccessible after the start time; and for a particular test subject data structure, upon receipt of input from the input controls, updating the test subject data structure with data specifying names of selected securities and concentrations of selected securities; determining whether a conflict exists among concentrations of securities in the test subject data structure and the BBSI constraints; and if a conflict exists, receiving input to resolve the conflict; and at the end time, determining a rank ordering of the test subject data structures in accordance with respective monetary values of the test subject data structures.

Example 4. The computer-implemented method of any of the preceding examples, further comprising: causing rendering, on a client device, of one or more graphical user interfaces with one or more visual representations of results of test subjects.

Example 5. The computer-implemented method of any of the preceding examples, wherein the BBSI constraints specify: the BBSI constraints comprise nine or more component securities; no single component security comprises more than 30 percent of the index's weighting; all of the component securities are registered under exchange act regulation.

Example 6. The computer-implemented method of any of the preceding examples, further comprising: prompting, through the graphical user interface, the test subject to select a prepopulated template from one or more prepopulated templates, where each prepopulated template of the one or more prepopulated templates specifies a plurality of concentrations for completing a BBSI for the user and that satisfy the constraints for constructing a BBSI; and in response to a selection of the prepopulated template: accessing, from the hardware storage device, a plurality of data records that are structured to specify the plurality of concentrations and, for each of the plurality of concentrations, a respective security that is to be selected; receiving a selection of data specifying selection of a visual representation of the selected respective securities, with the selection data being associated with the key that uniquely identifies the test subject associated with the selection data; parsing, by the parser of the data processing system, the plurality of data records to identify, based on the structure, data specifying the selected respective securities and data specifying the plurality of concentrations; and storing, in the hardware storage device, the plurality of keyed data records structured with data specifying the plurality of selected securities and the plurality of concentrations.

Example 7. The computer-implemented method of any of the preceding examples, further comprising: prompting a test subject, through the graphical user interface, to select, for each of the plurality of concentrations, a respective security for the concentration from a set of securities that satisfy the BBSI constraints.

Example 8. The computer-implemented method of any of the preceding examples, further comprising: selecting, by a prediction model, for each of the plurality of concentrations, a respective security for the concentration from a set of securities that satisfy the BBSI constraints.

Example 9. The computer-implemented method of any of the preceding examples, wherein the parser of the data processing system comprises a trained prediction model trained to identify, based on the structure, data specifying the selected respective securities and data specifying the plurality of concentrations.

Example 10. The computer-implemented method of any of the preceding examples, wherein the one or more prepopulated templates comprise one or more maximally concentrated templates.

Example 11. The computer-implemented method of any of the preceding examples, wherein the one or more prepopulated templates comprise one or more equally concentrated templates.

Example 1[2]. The computer-implemented method of any of the preceding examples, further comprising: accessing, from an external hardware storage device, real time market data specifying at least, for each security in a security market, a respective price history, a respective trade volume history, and a respective market capitalization; processing the real time market data to determine, for each security in the security market, a respective average daily trading volume ("ADTV") for the security and a respective correlation coefficient for the security with respect to at least one of the securities and the one or more previously selected securities ("real time data"); and based on the parsed data and the real time data, determining, by the data processing system, whether a conflict exists among the concentration of the security with respective concentrations of the previously selected securities and the BBSI constraints.

Example 13. A server system for communicating with client devices for simultaneously conducting tests over a network based on communications received from the client devices, with each of the tests being equally constrained by applying one or more boundary conditions, a time constraint, inbound latency constraints and an outbound latency constraint, the server system comprising: a user interface sub-system that generates a user interface that renders on client devices a plurality of input test portions and input weighting portions, with an input test portion juxtaposed to an input weighting portion in the user interface, with an input test portion being for receiving input representing a testing event, and with an input weighting portion being for receiving input specifying a weight of a testing event represented by input into a input test portion juxtaposed to the input weighting portion; a memory that receives, from the client devices, communications comprising input for the input test portions and the input weighting portions, wherein the input received from a respective client device defines an order of testing events; and a processor configured to generate and constrain tests based on input specified for the input test portions and input weighting portions comprised in graphical user interfaces rendered on the client devices, with a test, for a given client device, comprising testing events specified by input test portions rendered on a graphical user interface displayed on the given client device, for each testing event, generate an associated weight specified by an input weight portion juxtaposed to a respective input test portion, with each of the tests being equally constrained in accordance with the one or more boundary conditions specifying a criteria for the testing events to satisfy to be comprised in the test, the time constraint, the inbound latency constraints and the outbound latency constraint to control a transmission of electronic test orders from the client devices independent of computational powers of the client devices, constrain the tests in accordance with the inbound latency constraints by, for each client device: as an item of input is received, applying one or more of the inbound latency constraints by: based on a weight input into a input weighting portion for a first testing event specified by an input testing portion, generate a notification of a maximum weight assignable to a second testing event that comes sequentially after the first testing event in the order, with the maximum weight being in accordance with the one or more boundary conditions, and based on a given testing event specified to be first in the order, cause rendering on a display of the client device in near real time relative to when input specifying the given testing event is received and ranked in descending order, visual representations of other testing events that are candidates for inclusion in the test, wherein juxtaposed to each visual representation is an indicator specifying a direction of a relationship between the given testing event and the testing event represented by that visual representation, and in response to receiving an indication of completion of selection of the testing events, apply one or more remaining inbound latency constraints to the lowest weighted testing event; and a testing engine configured, upon determining that each of the tests complies with the one or more boundary conditions, the time constraint, the inbound latency constraints and the outbound latency constraint, to conduct the tests and determine performances of the tests relative to each other.

Example 14. The server system of the preceding example, wherein the BBSI constraints specify: the BBSI has ten or more component securities; no single component security comprises more than 30 percent of the index's weighting; the five highest weighted component securities together comprise no more than 60 percent of the index's weighting; and the lowest weighted component securities comprising, in the aggregate, 25 percent of the index's weighting have an aggregate value of average daily trading volume (ADTV) of $50 million or more (or in the case of an index with 15 or more component securities, $30 million or more).

Example 15. The server system of any of the preceding examples, further comprising: generating, by the data processing system, a test in which a plurality of test subjects construct respective test subject specific BBSIs, with each test subject corresponding to one or more data structures ("test subject data structures") stored in a hardware storage device, wherein the test has a start time, an end time, and a predetermined monetary budget for the test subject specific BBSIs, wherein the method comprises: prior to the start time, generating, by the data processing system, a graphical user interface with a plurality of input controls for receiving input specifying one or more securities from a pre-specified selection universe for inclusion in the test subject specific BBSI, with the graphical user interface being accessible before the start time and being inaccessible after the start time; and for a particular test subject data structure, upon receipt of input from the input controls, updating the test subject data structure with data specifying names of selected securities and concentrations of selected securities; determining whether a conflict exists among concentrations of securities in the test subject data structure and the BBSI constraints; and if a conflict exists, receiving input to resolve the conflict; and at the end time, determining a rank ordering of the test subject data structures in accordance with respective monetary values of the test subject data structures.

Example 16. The server system of any of the preceding examples, wherein the BBSI constraints specify: the BBSI has nine or more component securities; no single component security comprises more than 30 percent of the index's weighting; all of the component securities are registered under section 12 of the Exchange Act; and each component security is both one of the 750 securities with the largest market capitalization and one of the 675 component securities with the largest value of the average daily trading volume ("ADTV").

Example 17. The server system of any of the preceding examples, further comprising: prompting, through the graphical user interface, the test subject to select a prepopulated template from one or more prepopulated templates, where each prepopulated template of the one or more prepopulated templates specifies a plurality of concentrations for completing a BBSI for the test subject and that satisfy the constraints for constructing a BBSI; and if the test subject selects the prepopulated template: accessing, from the hardware storage device, a plurality of data records that are structured to specify the plurality of concentrations and, for each of the plurality of concentrations, a respective security that is to be selected by the test subject; prompting the test subject, through the graphical user interface, to select, for each of the plurality of concentrations, a respective security for the concentration from a set of securities that satisfy the BBSI constraints; receiving, through the graphical user interface, selection data specifying selection of a visual representation of the selected respective securities, with the selection data being associated with the key that uniquely identifies the test subject associated with the selection data; parsing, by the parser of the data processing system, the plurality of data records to identify, based on the structure, data specifying the selected respective securities and data specifying the plurality of concentrations; and storing, in the hardware storage device, the plurality of keyed data records structured with data specifying the plurality of selected securities and the plurality of concentrations.

Example 18. The server system of any of the preceding examples, wherein the one or more prepopulated templates comprises a maximally concentrated template, wherein the one or more prepopulated templates comprises an equally concentrated template.

Example 19. The server system of any of the preceding examples, further comprising: accessing, from an external hardware storage device, real time market data specifying at least, for each security in a security market, a respective price history, a respective trade volume history, and a respective market capitalization; processing the real time market data to determine, for each security in the security market, a respective average daily trading volume ("ADTV") for the security and a respective correlation coefficient for the security with respect to at least one of the securities and the one or more previously selected securities ("real time data"); and based on the parsed data and the real time data, determining, by the data processing system, whether a conflict exists among the concentration of the security with respective concentrations of the previously selected securities and the BBSI constraints.

Example 20. One or more non-transitory computer storage media storing instructions that when executed by one or more computers cause the one or more computers to perform operations for constructing a maximally concentrated Broad-Based Security Index, the operations comprising: accessing, by a data processing system and from a hardware device, outbound latency data and inbound latency data defining an outbound latency and an inbound latency to control a transmission of electronic test orders from a plurality of test subject devices independent of computational powers of the plurality of test subject devices; restricting, by the data processing system, the outbound latency defined by the outbound latency data to execution of electronic test orders by, for each of a plurality of test subject devices, restricting transmission of an electronic test order to one or more times; and restricting transmission of the electronic test order to an electronic test environment; imposing, by the data processing system, the inbound latency defined by the inbound latency data to submission of electronic test orders by, for each of the test subject devices, receiving, by the data processing system, an electronic test order comprising a weighted value; transmitting, in real-time, by the data processing system and to a test subject device of the plurality of test subject devices, an indication of one or more additional electronic test orders that are candidates for selection that satisfy one or more boundary conditions of the electronic test environment, with a boundary condition specifying a maximum weighted value of another electronic test order based on the weighted value of the electronic test order, with the indication, for each additional electronic test order, specifying a maximum weighted value assignable to that additional electronic test order based on the weighted value of the electronic test order and further specifying a cross correlation metric for that additional electronic test order; in accordance with imposing the outbound and inbound latencies, receiving, from each test subject device, a plurality of electronic test orders satisfying the one or more boundary conditions; and triggering an execution of the electronic test orders by an electronic test environment.

What is claimed is:

1. A computer-implemented method for inbound and outbound latency leveling in an electronic test environment, the computer-implemented method comprising:

accessing, by a data processing system and from a hardware device, outbound latency data and inbound latency data defining an outbound latency and an inbound latency to control a transmission of electronic test orders from a plurality of test subject devices independent of the computational powers of the plurality of test subject devices;

restricting, by the data processing system, the outbound latency defined by the outbound latency data to execution of electronic test orders by, for each of a plurality of test subject devices, restricting transmission of an electronic test order to one or more times; and restricting transmission of the electronic test order to an electronic test environment;

imposing, by the data processing system, the inbound latency defined by the inbound latency data to submission of electronic test orders by, for each of the test subject devices, receiving, by the data processing system, an electronic test order comprising a weighted value;

transmitting, in real-time, by the data processing system and to a test subject device of the plurality of test subject devices, an indication of one or more additional electronic test orders that are candidates for selection that satisfy one or more boundary conditions of the electronic test environment, with a boundary condition specifying a maximum weighted value of another electronic test order based on the weighted value of the electronic test order, with the indication, for each additional electronic test order, specifying a maximum weighted value assignable to that additional electronic test order based on the weighted value of the electronic test order and further specifying a cross correlation metric for that additional electronic test order;

in accordance with imposing the inbound latency and restricting the outbound latency, receiving, from each test subject device, a plurality of electronic test orders satisfying the one or more boundary conditions, comprising:

generating, by the data processing system, a test in which a plurality of test subjects construct respective test subject specific broad-based security index (BBSIs), with each test subject corresponding to one or more test subject data structures stored in a hardware storage device, wherein the test has a start time, an end time, and a predetermined monetary budget for the test subject specific BBSIs;

prior to the start time, generating, by the data processing system, a graphical user interface with a plurality of input controls for receiving input specifying one or more of the electronic test orders from a pre-specified selection universe for inclusion in the test subject specific BBSI, with the graphical user interface being accessible before the start time and being inaccessible after the start time;

for a particular test subject data structure, upon receipt of input from the input controls, updating the test subject data structure with data specifying names of selected of the electronic test orders and concentrations of selected electronic test orders;

determining whether a conflict exists among concentrations of the electronic test orders in the test subject data structure and the BBSI constraints; and when a conflict exists, receiving input to resolve the conflict;

triggering an execution of the electronic test orders by an electronic test environment; and determining a rank ordering of the electronic test orders in accordance with respective monetary values of the electronic test orders.

2. The computer-implemented method of claim 1, wherein the one or more boundary conditions comprise constraints specifying:

no single component of the electronic test orders comprises more than 30 percent of an index weighting;

five highest weighted components of the electronic test orders together comprise no more than 60 percent of the index's weighting; and the lowest weighted component of the electronic test orders comprising, in an aggregate, 25 percent of the index's weighting have an aggregate value of average daily trading volume (ADTV) of a threshold value.

3. The computer-implemented method of claim 1, further comprising:

causing rendering, on a client device, of one or more graphical user interfaces with one or more visual representations of results of test subjects.

4. The computer-implemented method of claim 1, wherein the BBSI constraints specify:

the BBSI has nine or more of the electronic test orders; and no single electronic test order comprises more than 30 percent of an index weighting.

5. The computer-implemented method of claim 1, further comprising:

prompting, through the graphical user interface, the test subject to select a prepopulated template from one or more prepopulated templates, where each prepopulated template of the one or more prepopulated templates specifies a plurality of concentrations for completing a BBSI for the user and that satisfy the constraints for constructing a BBSI; and in response to a selection of the prepopulated template:

accessing, from the hardware storage device, a plurality of data records that are structured to specify the plurality of concentrations and, for each of the plurality of concentrations, a respective electronic test order that is to be selected;

receiving a selection of data specifying selection of a visual representation of the selected respective electronic test order, with the selection data being associated with the key that uniquely identifies the test subject associated with the selection data;

parsing, by a parser of the data processing system, the plurality of data records to identify, based on the structure, data specifying the selected respective electronic test order and data specifying the plurality of concentrations; and storing, in the hardware storage device, the plurality of keyed data records structured with data specifying the plurality of selected electronic test order and the plurality of concentrations.

6. The computer-implemented method of claim 5, further comprising:

prompting a test subject, through the graphical user interface, to select, for each of the plurality of concentrations, a respective electronic test order for the concentration from a set of electronic test orders that satisfy the BBSI constraints.

7. The computer-implemented method of claim 6, further comprising:

selecting, by a prediction model, for each of the plurality of concentrations, a respective electronic test order for the concentration from a set of electronic test orders that satisfy the BBSI constraints.

8. The computer-implemented method of claim 6, wherein the parser of the data processing system comprises a trained prediction model trained to identify, based on the structure, data specifying the selected respective electronic test orders and data specifying the plurality of concentrations.

9. The computer-implemented method of claim 6, wherein the one or more prepopulated templates comprise one or more maximally concentrated templates.

10. The computer-implemented method of claim 9, wherein the one or more prepopulated templates comprise one or more equally concentrated templates.

11. A non-transitory computer storage media storing instructions that when executed by one or more computers cause the one or more computers to perform operations comprising:

accessing, from a hardware device, outbound latency data and inbound latency data defining an outbound latency and an inbound latency to control a transmission of electronic test orders from a plurality of test subject devices independent of computational powers of the plurality of test subject devices;

restricting the outbound latency defined by the outbound latency data to execution of electronic test orders by, for each of a plurality of test subject devices, restricting transmission of an electronic test order to one or more times; and restricting transmission of the electronic test order to an electronic test environment;

imposing the inbound latency defined by the inbound latency data to submission of electronic test orders by, for each of the test subject devices, receiving an electronic test order comprising a weighted value;

transmitting, in real-time, to a test subject device of the plurality of test subject devices, an indication of one or more additional electronic test orders that are candidates for selection that satisfy one or more boundary conditions of the electronic test environment, with a boundary condition specifying a maximum weighted value of another electronic test order based on the weighted value of the electronic test order, with the indication, for each additional electronic test order, specifying a maximum weighted value assignable to that additional electronic test order based on the weighted value of the electronic test order and further specifying a cross correlation metric for that additional electronic test order;

in accordance with imposing the inbound latency and restricting the outbound latency, receiving, from each test subject device, a plurality of electronic test orders satisfying the one or more boundary conditions, comprising:

generating, by the data processing system, a test in which a plurality of test subjects construct respective test subject specific broad-based security index (BBSIs), with each test subject corresponding to one or more test subject data structures stored in the hardware device, wherein the test has a start time, an end time, and a predetermined monetary budget for the test subject specific BBSIs;

prior to the start time, generating a graphical user interface with a plurality of input controls for receiving input specifying one or more of the electronic test orders from a pre-specified selection universe for inclusion in the test subject specific BBSI, with the graphical user interface being accessible before the start time and being inaccessible after the start time;

for a particular test subject data structure, upon receipt of input from the input controls, updating the test subject data structure with data specifying names of selected of the electronic test orders and concentrations of selected electronic test orders;

determining whether a conflict exists among concentrations of the electronic test orders in the test subject data structure and the BBSI constraints; and when a conflict exists, receiving input to resolve the conflict;

triggering an execution of the electronic test orders by an electronic test environment; and determining a rank ordering of the electronic test orders in accordance with respective monetary values of the electronic test orders.

12. The non-transitory computer storage media of claim 11, wherein the operations further comprise:

prompting, through the graphical user interface, the test subject to select a prepopulated template from one or more prepopulated templates, where each prepopulated template of the one or more prepopulated templates specifies a plurality of concentrations for the test subject and that satisfy the constraints; and receiving a selection of the prepopulated template from one or more prepopulated templates.

13. The non-transitory computer storage media of claim 12, wherein the operations further comprise:

accessing, from the hardware device, a plurality of data records that are structured to specify the plurality of concentrations and, for each of the plurality of concentrations, a respective security that is to be selected by the test subject;

prompting the test subject, through the graphical user interface, to select, for each of the plurality of concentrations, a respective security for the concentration from a set of securities that satisfy the constraints;

receiving, through the graphical user interface, selection data specifying selection of a visual representation of the selected respective securities, with the selection data being associated with the key that uniquely identifies the test subject associated with the selection data;

parsing, by a parser, the plurality of data records to identify, based on the structure, data specifying the selected respective securities and data specifying the plurality of concentrations; and storing, in the hardware device, the plurality of keyed data records structured with data specifying the plurality of selected securities and the plurality of concentrations.

14. A system comprising:

one or more processors; and one or more non-transitory machine readable hardware storage devices storing instructions that are executable by the one or more processors to perform operations comprising:

accessing, from a hardware device, outbound latency data and inbound latency data defining an outbound latency and an inbound latency to control a transmission of electronic test orders from a plurality of test subject devices independent of the computational powers of the plurality of test subject devices;

restricting the outbound latency defined by the outbound latency data to execution of electronic test orders by, for each of a plurality of test subject devices, restricting transmission of an electronic test order to one or more times; and restricting transmission of the electronic test order to an electronic test environment;

imposing the inbound latency defined by the inbound latency data to submission of electronic test orders by, for each of the test subject devices, receiving an electronic test order comprising a weighted value;

transmitting, in real-time, to a test subject device of the plurality of test subject devices, an indication of one or more additional electronic test orders that are candidates for selection that satisfy one or more boundary conditions of the electronic test environment, with a boundary condition specifying a maximum weighted value of another electronic test order based on the weighted value of the electronic test order, with the indication, for each additional electronic test order, specifying a maximum weighted value assignable to that additional electronic test order based on the weighted value of the electronic test order and further specifying a cross correlation metric for that additional electronic test order;

in accordance with imposing the inbound latency and restricting the outbound latency, receiving, from each test subject device, a plurality of electronic test orders satisfying the one or more boundary conditions, comprising:

generating a test in which a plurality of test subjects construct respective test subject specific broad-based security index (BBSIs), with each test subject corresponding to one or more test subject data structures stored in the hardware device, wherein the test has a start time, an end time, and a predetermined monetary budget for the test subject specific BBSIs;

prior to the start time, generating a graphical user interface with a plurality of input controls for receiving input specifying one or more of the electronic test orders from a pre-specified selection universe for inclusion in the test subject specific BBSI, with the graphical user interface being accessible before the start time and being inaccessible after the start time;

for a particular test subject data structure, upon receipt of input from the input controls, updating the test subject data structure with data specifying names of selected of the electronic test orders and concentrations of selected electronic test orders;

determining whether a conflict exists among concentrations of the electronic test orders in the test subject data structure and the BBSI constraints; and when a conflict exists, receiving input to resolve the conflict;

triggering an execution of the electronic test orders by an electronic test environment; and determining a rank ordering of the electronic test orders in accordance with respective monetary values of the electronic test orders.

15. The system of claim 14, wherein the one or more boundary conditions comprise constraints specifying:

no single component of the electronic test orders comprises more than 30 percent of an index weighting;

five highest weighted components of the electronic test orders together comprise no more than 60 percent of the index's weighting; and the lowest weighted component of the electronic test orders comprising, in an aggregate, 25 percent of the index's weighting have an aggregate value of average daily trading volume (ADTV) of a threshold value.

16. The system of claim 14, wherein the operations further comprise:

causing rendering, on a client device, of one or more graphical user interfaces with one or more visual representations of results of test subjects.

17. The system of claim 14, wherein the BBSI constraints specify:

the BBSI has nine or more of the electronic test orders; and no single electronic test order comprises more than 30 percent of an index weighting.

18. The system of claim 14, wherein the operations further comprise:

prompting, through the graphical user interface, the test subject to select a prepopulated template from one or more prepopulated templates, where each prepopulated template of the one or more prepopulated templates specifies a plurality of concentrations for completing a BBSI for the user and that satisfy the constraints for constructing a BBSI; and in response to a selection of the prepopulated template:

accessing, from the hardware device, a plurality of data records that are structured to specify the plurality of concentrations and, for each of the plurality of concentrations, a respective electronic test order that is to be selected;

receiving a selection of data specifying selection of a visual representation of the selected respective electronic test order, with the selection data being associated with the key that uniquely identifies the test subject associated with the selection data;

parsing, by a parser of the data processing system, the plurality of data records to identify, based on the structure, data specifying the selected respective electronic test order and data specifying the plurality of concentrations; and storing, in the hardware device, the plurality of keyed data records structured with data specifying the plurality of selected electronic test order and the plurality of concentrations.

19. The system of claim 18, wherein the operations further comprise:

prompting a test subject, through the graphical user interface, to select, for each of the plurality of concentrations, a respective electronic test order for the concentration from a set of electronic test orders that satisfy the BBSI constraints.

20. The system of claim 19, wherein the operations further comprise:

selecting, by a prediction model, for each of the plurality of concentrations, a respective electronic test order for the concentration from a set of electronic test orders that satisfy the BBSI constraints.

* * * * *